(12) United States Patent
Sylthe

(10) Patent No.: US 8,572,479 B2
(45) Date of Patent: Oct. 29, 2013

(54) SYSTEMS AND METHODS FOR CONTENT DELIVERY OVER A WIRELESS COMMUNICATION MEDIUM TO A PORTABLE COMPUTING DEVICE

(75) Inventor: Olav A. Sylthe, Atlanta, GA (US)

(73) Assignee: Arizan Corporation, Atlanta, GA (US)

(*) Notice: Subject to any disclaimer, the term of this patent is extended or adjusted under 35 U.S.C. 154(b) by 363 days.

(21) Appl. No.: 13/089,749

(22) Filed: Apr. 19, 2011

(65) Prior Publication Data

US 2011/0196921 A1    Aug. 11, 2011

Related U.S. Application Data

(63) Continuation of application No. 10/106,900, filed on Mar. 25, 2002, now Pat. No. 7,954,055.

(60) Provisional application No. 60/278,137, filed on Mar. 23, 2001.

(51) Int. Cl.
  *G06F 17/00* (2006.01)

(52) U.S. Cl.
  USPC ........................................... 715/243

(58) Field of Classification Search
  USPC ........................... 715/243, 255, 273
  See application file for complete search history.

(56) References Cited

U.S. PATENT DOCUMENTS

| | | | |
|---|---|---|---|
| 5,644,776 A | 7/1997 | DeRose et al. | |
| 5,708,806 A | 1/1998 | DeRose et al. | |
| 5,761,328 A | 6/1998 | Solberg et al. | |
| 6,105,044 A | 8/2000 | DeRose et al. | |
| 6,205,485 B1 | 3/2001 | Kikinis | |
| 6,311,187 B1 | 10/2001 | Jeyaraman | |
| 6,336,124 B1 | 1/2002 | Alam et al. | |
| 6,341,334 B1 | 1/2002 | Kamemaru | |
| 6,377,957 B1 | 4/2002 | Jeyaraman | |
| 6,389,467 B1 | 5/2002 | Eyal | |
| 6,401,132 B1 | 6/2002 | Bellwood et al. | |
| 6,404,445 B1 | 6/2002 | Galea et al. | |
| 6,430,624 B1 | 8/2002 | Jamtgaard et al. | |
| 6,438,594 B1 * | 8/2002 | Bowman-Amuah | 709/225 |

(Continued)

FOREIGN PATENT DOCUMENTS

| | | |
|---|---|---|
| EP | 0969389 | 1/2000 |
| JP | 11-250041 | 9/1999 |

(Continued)

OTHER PUBLICATIONS

Feiner, Steven, et al., "Hybrid User Interfaces: Breeding Virtually Bigger Interfaces for Physically Smaller Computers", Proceedings of the 4th Annual ACM Symposium on User Interface Software and Technology, Oct. 1991, pp. 9-17.

(Continued)

*Primary Examiner* — Laurie Ries
(74) *Attorney, Agent, or Firm* — Jones Day

(57) ABSTRACT

A system which analyzes, organizes and stores electronic documents in a document object model using a common markup language. The document object model is stored on a server the content is delivered to the wireless devices in a universal content system format. By utilizing the document object model and the universal content stream with a corresponding reader on the wireless device, the electronic document is reduced to only the essential content and the necessary format information for transmission.

24 Claims, 28 Drawing Sheets

(56) References Cited

U.S. PATENT DOCUMENTS

| | | |
|---|---|---|
| 6,538,673 B1 | 3/2003 | Maslov |
| 6,721,286 B1 | 4/2004 | Williams et al. |
| 2002/0030843 A1 | 3/2002 | Tuli |
| 2002/0035566 A1 | 3/2002 | Rugg et al. |
| 2002/0062395 A1 | 5/2002 | Thompson et al. |
| 2002/0118220 A1* | 8/2002 | Lui et al. .................... 345/709 |
| 2004/0268253 A1 | 12/2004 | DeMello et al. |

FOREIGN PATENT DOCUMENTS

| | | |
|---|---|---|
| JP | 11-288403 | 10/1999 |
| JP | 11-306067 | 11/1999 |
| JP | 2000082039 | 3/2000 |
| JP | 2000194612 | 7/2000 |
| JP | 2002-222398 | 8/2000 |
| JP | 2000-322425 | 11/2000 |
| WO | 99-05613 | 2/1999 |
| WO | 00/39666 | 7/2000 |
| WO | 0042531 | 7/2000 |
| WO | 01/14951 | 3/2001 |

OTHER PUBLICATIONS

O'Hara, Robert, "Microsoft Windows CE: A New Handheld Computing Platform", Proceedings of the 1997 ACM Symposium on Applied Computer, Apr. 1997, pp. 295-296.

IBM: "Converting HTML to well formed XML with preference based tag expansion," Research Disclosure, Mason Publications, Hampshire, GB, vol. 423, No. 111, Jul. 1999, XP007124645.

Bjork, Staffan, et al, "WEST: A Web Browser for Small Terminals", Proceedings of the 12th Annual ACM Symposium on User Interface Software and Technology, Nov. 1999, pp. 187-196.

Buyukkokten, Orkut, et al, "Power Browser: Efficient Web Browsing for PDAs", Proceedings of the SIGCHI Conference on Human Factors in Computing Systems, Apr. 2000, pp. 430-437.

Hori M. et al.: "Annotation-based Web content transcoding," Computer Networks, Elsevier Science Publishers B.V., Amsterdam, NL, vol. 33, No. 1-6, Jun. 2000, pp. 197-211, XP004304767.

Hinckley, Ken, et al, "Sensing Techniques for Mobile Interaction", Proceedings of the 13th Annual ACM Symposium on User Interface Software and Technology, Nov. 2000, pp. 91-100.

CIPO: Office Action for Canadian Patent Application No. 2441607 dated Sep. 15, 2008 citing WO/2001/014951 and US 6430624 (3 pages).

Office action issued by the Japanese Patent Office on Apr. 2, 2010 in connection with Japanese patent application No. 2002-575832.

Office Action issued by the Japanese Patent Office on Aug. 16, 2010 for Application No. 2008-099834.

Japanese Official Action issued by the Japanese Patent Office on Jul. 11, 2013 for Japanese Patent Application No. 2011-032647, English translation.

* cited by examiner

| 380 | | | 360 | |
|---|---|---|---|---|
| 41 | HYPERLINK BEGIN | | 41 | PARAGRAPH |
| 42 | SIMPLE FONT CHANGE | | 42 | PARAGRAPH INFORMATION |
| 43 | TEXT SEGMENT | | 43 | HYPERLINK BEGIN |
| 44 | SIMPLE FONT CHANGE | | 44 | SIMPLE FONT CHANGE |
| 45 | TEXT SEGMENT | | 45 | TEXT SEGMENT |
| 46 | TEXT SEGMENT | | 46 | SIMPLE FONT CHANGE |
| 47 | HYPERLINK END | | 47 | TEXT SEGMENT |
| 48 | PARAGRAPH | | 48 | TEXT SEGMENT |
| 49 | PARAGRAPH INFORMATION | | 49 | HYPERLINK END |
| 50 | HYPERLINK BEGIN | | 50 | PARAGRAPH |
| 51 | SIMPLE FONT CHANGE | | 51 | PARAGRAPH INFORMATION |
| 52 | TEXT SEGMENT | | 52 | HYPERLINK BEGIN |
| 53 | SIMPLE FONT CHANGE | | 53 | SIMPLE FONT CHANGE |
| 54 | TEXT SEGMENT | | 54 | TEXT SEGMENT |
| 55 | TEXT SEGMENT | | 55 | SIMPLE FONT CHANGE |
| 56 | HYPERLINK END | | 56 | TEXT SEGMENT |
| 57 | PARAGRAPH | | 57 | TEXT SEGMENT |
| 58 | PARAGRAPH INFORMATION | | 58 | HYPERLINK END |
| 59 | PARAGRAPH | | 59 | PARAGRAPH |
| 60 | PARAGRAPH INFORMATION | | 60 | PARAGRAPH INFORMATION |
| 61 | SIMPLE FONT CHANGE | | 61 | PARAGRAPH |
| 62 | TEXT SEGMENT | | 62 | PARAGRAPH INFORMATION |
| 63 | PARAGRAPH | | 63 | SIMPLE FONT CHANGE |
| 64 | PARAGRAPH INFORMATION | | 64 | TEXT SEGMENT |
| 65 | SIMPLE FONT CHANGE | | 65 | PARAGRAPH |
| 66 | TEXT SEGMENT | | 66 | PARAGRAPH INFORMATION |
| 67 | HYPERLINK BEGIN | | 67 | SIMPLE FONT CHANGE |
| 68 | SIMPLE FONT CHANGE | | 68 | TEXT SEGMENT |
| 69 | TEXT SEGMENT | | 69 | HYPERLINK BEGIN |
| 70 | HYPERLINK END | | 70 | SIMPLE FONT CHANGE |
| 71 | SIMPLE FONT CHANGE | | 71 | TEXT SEGMENT |
| 72 | TEXT SEGMENT | | 72 | HYPERLINK END |
| 73 | HYPERLINK BEGIN | | 73 | SIMPLE FONT CHANGE |
| 74 | SIMPLE FONT CHANGE | | 74 | TEXT SEGMENT |
| 75 | TEXT SEGMENT | | 75 | HYPERLINK BEGIN |
| 76 | BOOKMARK | | 76 | SIMPLE FONT CHANGE |
| 77 | TEXT SEGMENT | | 77 | TEXT SEGMENT |
| 78 | HYPERLINK END | | 78 | BOOKMARK |
| 79 | SIMPLE FONT CHANGE | | 79 | TEXT SEGMENT |
| 80 | TEXT SEGMENT | | 80 | HYPERLINK END |
| 81 | PARAGRAPH | | 81 | SIMPLE FONT CHANGE |
| 82 | PARAGRAPH INFORMATION | | 82 | TEXT SEGMENT |
| 83 | REFERENCE 1 - TEXT BOX | | 83 | PARAGRAPH |
| 84 | REFERENCE 2 - IMAGE | | 84 | PARAGRAPH INFORMATION |
| 85 | SIMPLE FONT CHANGE | | 85 | SIMPLE FONT CHANGE |

FIG. 21B

| 380 | | 360 | |
|---|---|---|---|
| 86 | TEXT SEGMENT | 86 | TEXT SEGMENT |
| 87 | PARAGRAPH | 87 | PARAGRAPH |
| 88 | PARAGRAPH INFORMATION | 88 | PARAGRAPH INFORMATION |
| 89 | SIMPLE FONT CHANGE | 89 | SIMPLE FONT CHANGE |
| 90 | TEXT SEGMENT | 90 | TEXT SEGMENT |
| 91 | PARAGRAPH | 91 | PARAGRAPH |
| 92 | PARAGRAPH INFORMATION | 92 | PARAGRAPH INFORMATION |
| 93 | SIMPLE FONT CHANGE | 93 | SIMPLE FONT CHANGE |
| 94 | TEXT SEGMENT | 94 | TEXT SEGMENT |
| 95 | TEXT SEGMENT | 95 | TEXT SEGMENT |
| 96 | HYPERLINK BEGIN | 96 | HYPERLINK BEGIN |
| 97 | SIMPLE FONT CHANGE | 97 | SIMPLE FONT CHANGE |
| 98 | TEXT SEGMENT | 98 | TEXT SEGMENT |
| 99 | HYPERLINK END | 99 | HYPERLINK END |
| 100 | PARAGRAPH | 100 | PARAGRAPH |
| 101 | PARAGRAPH INFORMATION | 101 | PARAGRAPH INFORMATION |
| 102 | SIMPLE FONT CHANGE | 102 | SIMPLE FONT CHANGE |
| 103 | TEXT SEGMENT | 103 | TEXT SEGMENT |
| 104 | PARAGRAPH | 104 | PARAGRAPH |
| 105 | PARAGRAPH INFORMATION | 105 | PARAGRAPH INFORMATION |
| 106 | SIMPLE FONT CHANGE | 106 | SIMPLE FONT CHANGE |
| 107 | TEXT SEGMENT | 107 | TEXT SEGMENT |
| 108 | TEXT SEGMENT | 108 | TEXT SEGMENT |
| 109 | TEXT SEGMENT | 109 | TEXT SEGMENT |
| 110 | PARAGRAPH | 110 | PARAGRAPH |
| 111 | PARAGRAPH INFORMATION | 111 | PARAGRAPH INFORMATION |
| 112 | REFERENCE 3 - IMAGE | 112 | SIMPLE FONT CHANGE |
| 113 | SIMPLE FONT CHANGE | 113 | TEXT SEGMENT |
| 114 | TEXT SEGMENT | 114 | PARAGRAPH |
| 115 | REFERENCE 4 - SPREADSHEET | 115 | PARAGRAPH INFORMATION |
| 116 | PARAGRAPH | 116 | SIMPLE FONT CHANGE |
| 117 | PARAGRAPH INFORMATION | 117 | TEXT SEGMENT |
| 118 | SIMPLE FONT CHANGE | 118 | PARAGRAPH |
| 119 | TEXT SEGMENT | 119 | PARAGRAPH INFORMATION |
| 120 | PARAGRAPH | 120 | PARAGRAPH |
| 121 | PARAGRAPH INFORMATION | 121 | PARAGRAPH INFORMATION |
| 122 | PARAGRAPH | 122 | SIMPLE FONT CHANGE |
| 123 | PARAGRAPH INFORMATION | 123 | TEXT SEGMENT |
| 124 | SIMPLE FONT CHANGE | 124 | TEXT SEGMENT |
| 125 | TEXT SEGMENT | 125 | PARAGRAPH |
| 126 | TEXT SEGMENT | 126 | PARAGRAPH INFORMATION |
| 127 | PARAGRAPH | 127 | SIMPLE FONT CHANGE |
| 128 | PARAGRAPH INFORMATION | 128 | TEXT SEGMENT |
| 129 | SIMPLE FONT CHANGE | 129 | PARAGRAPH |
| 130 | TEXT SEGMENT | 130 | PARAGRAPH INFORMATION |

FIG. 21C

| 380 | |
|---|---|
| 131 | PARAGRAPH |
| 132 | PARAGRAPH INFORMATION |
| 133 | SIMPLE FONT CHANGE |
| 134 | TEXT SEGMENT |
| 135 | PARAGRAPH |
| 136 | PARAGRAPH INFORMATION |
| 137 | PARAGRAPH |
| 138 | PARAGRAPH INFORMATION |
| 139 | SIMPLE FONT CHANGE |
| 140 | TEXT SEGMENT |
| 141 | TEXT SEGMENT |
| 142 | PARAGRAPH |
| 143 | PARAGRAPH INFORMATION |
| 144 | SIMPLE FONT CHANGE |
| 145 | TEXT SEGMENT |
| 146 | PARAGRAPH |
| 147 | PARAGRAPH INFORMATION |
| 148 | SIMPLE FONT CHANGE |
| 149 | TEXT SEGMENT |
| 150 | PARAGRAPH |
| 151 | PARAGRAPH INFORMATION |
| 152 | PARAGRAPH |
| 153 | PARAGRAPH INFORMATION |
| 154 | PARAGRAPH |
| 155 | PARAGRAPH INFORMATION |
| 156 | SIMPLE FONT CHANGE |
| 157 | TEXT SEGMENT |
| 158 | HYPERLINK BEGIN |
| 159 | SIMPLE FONT CHANGE |
| 160 | TEXT SEGMENT |
| 161 | HYPERLINK END |
| 162 | SIMPLE FONT CHANGE |
| 163 | TEXT SEGMENT |
| 164 | TEXT SEGMENT |
| 165 | REFERENCE CONTAINERS |
| 166 | REFERENCE 1 |
| 167 | REFERENCE 2 |
| 168 | REFERENCE 3 |
| 169 | REFERENCE 4 |
| 170 | END OF DOCUMENT |

FIG. 21D

| 360 | |
|---|---|
| 131 | SIMPLE FONT CHANGE |
| 132 | TEXT SEGMENT |
| 133 | PARAGRAPH |
| 134 | PARAGRAPH INFORMATION |
| 135 | PARAGRAPH |
| 136 | PARAGRAPH INFORMATION |
| 137 | SIMPLE FONT CHANGE |
| 138 | TEXT SEGMENT |
| 139 | TEXT SEGMENT |
| 140 | PARAGRAPH |
| 141 | PARAGRAPH INFORMATION |
| 142 | SIMPLE FONT CHANGE |
| 143 | TEXT SEGMENT |
| 144 | PARAGRAPH |
| 145 | PARAGRAPH INFORMATION |
| 146 | SIMPLE FONT CHANGE |
| 147 | TEXT SEGMENT |
| 148 | PARAGRAPH |
| 149 | PARAGRAPH INFORMATION |
| 150 | PARAGRAPH |
| 151 | PARAGRAPH INFORMATION |
| 152 | PARAGRAPH |
| 153 | PARAGRAPH INFORMATION |
| 154 | SIMPLE FONT CHANGE |
| 155 | TEXT SEGMENT |
| 156 | HYPERLINK BEGIN |
| 157 | SIMPLE FONT CHANGE |
| 158 | TEXT SEGMENT |
| 159 | UCS SIGNATURE |
| 160 | DOCUMENT HEADER |
| 161 | DOCUMENT CONTAINER |
| 162 | PARAGRAPH |
| 163 | PARAGRAPH INFORMATION |
| 164 | BOOKMARK |
| 165 | SIMPLE FONT CHANGE |
| 166 | TEXT SEGMENT |
| 167 | PARAGRAPH |
| 168 | PARAGRAPH INFORMATION |
| 169 | SIMPLE FONT CHANGE |
| 170 | TEXT SEGMENT |
| 171 | PARAGRAPH |
| 172 | PARAGRAPH INFORMATION |
| 173 | PARAGRAPH |
| 174 | PARAGRAPH INFORMATION |
| 175 | BOOKMARK |

| | | |
|---|---|---|
| 360 | | |

| 176 | SIMPLE FONT CHANGE |
|---|---|
| 177 | TEXT SEGMENT |
| 178 | PARAGRAPH |
| 179 | PARAGRAPH INFORMATION |
| 180 | PARAGRAPH |
| 181 | PARAGRAPH INFORMATION |
| 182 | BOOKMARK |
| 183 | BOOKMARK |
| 184 | SIMPLE FONT CHANGE |
| 185 | TEXT SEGMENT |
| 186 | PARAGRAPH |
| 187 | PARAGRAPH INFORMATION |
| 188 | SIMPLE FONT CHANGE |
| 189 | TEXT SEGMENT |
| 190 | PARAGRAPH |
| 191 | PARAGRAPH INFORMATION |
| 192 | BOOKMARK |
| 193 | SIMPLE FONT CHANGE |
| 194 | TEXT SEGMENT |
| 195 | PARAGRAPH |
| 196 | PARAGRAPH INFORMATION |
| 197 | PARAGRAPH |
| 198 | PARAGRAPH INFORMATION |
| 199 | SIMPLE FONT CHANGE |
| 200 | TEXT SEGMENT |
| 201 | PARAGRAPH |
| 202 | PARAGRAPH INFORMATION |
| 203 | SIMPLE FONT CHANGE |
| 204 | TEXT SEGMENT |
| 205 | SIMPLE FONT CHANGE |
| 206 | TEXT SEGMENT |
| 207 | SIMPLE FONT CHANGE |
| 208 | TEXT SEGMENT |
| 209 | SIMPLE FONT CHANGE |
| 210 | TEXT SEGMENT |
| 211 | PARAGRAPH |
| 212 | PARAGRAPH INFORMATION |
| 213 | SIMPLE FONT CHANGE |
| 214 | TEXT SEGMENT |
| 215 | SIMPLE FONT CHANGE |
| 216 | TEXT SEGMENT |
| 217 | SIMPLE FONT CHANGE |
| 218 | TEXT SEGMENT |
| 219 | SIMPLE FONT CHANGE |
| 220 | TEXT SEGMENT |

FIG. 21E

SYSTEMS AND METHODS FOR CONTENT DELIVERY OVER A WIRELESS COMMUNICATION MEDIUM TO A PORTABLE COMPUTING DEVICE

CROSS REFERENCE TO RELATED APPLICATION

This patent application is a continuation of U.S. patent application Ser. No. 10/106,900, filed Mar. 25, 2002, and entitled "Systems and Methods for Content Delivery Over a Wireless Communication Medium to a Portable Computing Device," which claims priority to U.S. Provisional Application No. 60/278,137, entitled "Systems and Methods for Content Delivery Over a Wireless Communication Medium to a Portable Computing Device," filed Mar. 23, 2001, the entirety of both of which is herein incorporated by reference.

BACKGROUND OF THE INVENTION

1. Field of the Invention

The present invention relates generally to wireless content delivery of documents and more specifically relates to organizing document content to be requested by reconstructed and read on a wireless device.

2. Description of the Prior Art

With the rapidly expanding use of computers, electronic documents are stored and communicated between computers with relative ease. Full desktop systems and laptop systems readily transfer these documents over various communication media, such as the Internet.

It is also desirable, however, to utilize these documents with the wireless communications medium and utilizing mobile wireless devices. This presents a whole series of different problems, since the bandwidth available can be on the order of 4 to 48 kbps, which is not expected to increase past 56 kbps in the near term.

The wireless devices typically attempt to maximize battery life, while at the same time minimizing weight and the device physical size. Typically, the devices also include slow processors and a minimal amount of memory. At the same time, the devices have different, generally limited, operating systems, screen resolution and limited graphic rendering capabilities. Large documents with a wide variety of formats are therefore very unsuitable or impossible for use with these devices in their standard format.

It would thus be desirable to provide a system, which allows the wireless devices to have access to the electronic documents without regard to their size or formatting of the documents.

SUMMARY OF THE INVENTION

The present invention provides a system, which analyzes, organizes and stores electronic documents in a document object model using a common markup language. The document object model is stored on a server and the content is delivered to the wireless devices in a universal content stream format. By utilizing the document object model and the universal content stream with a corresponding reader on the wireless device, the electronic document is reduced to only the essential content and the necessary format information for wireless transmission.

To accomplish the above and related advantages, this invention may be embodied in the form illustrated in the accompanying drawings, attention being called to the fact, however, that the drawings are illustrative only, and that changes may be made in the specific construction illustrated without departing from the scope of the present invention.

BRIEF DESCRIPTION OF THE DRAWINGS

Various other functions, features and attendant advantages of the present invention will become fully appreciated as the same is described in conjunction with the accompanying drawings, in which like reference characters designate the same or similar parts throughout the several views, and wherein:

DETAILED DESCRIPTION OF THE INVENTION

Figure 1:
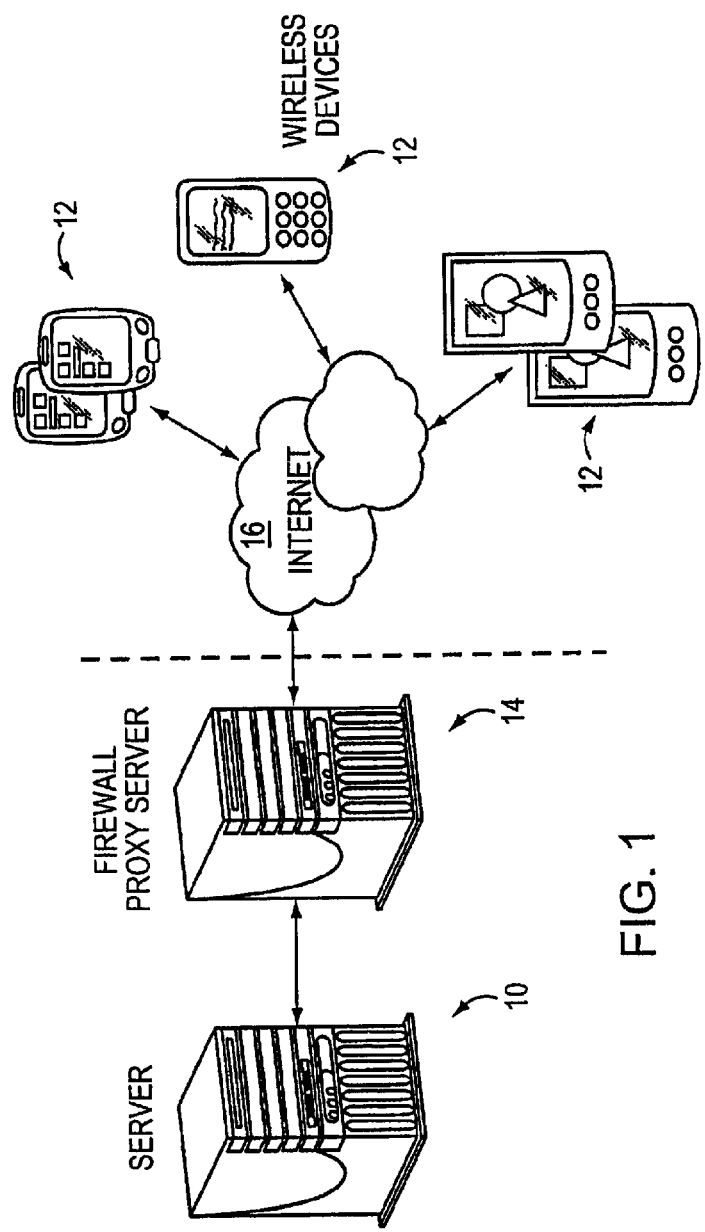

FIG. 1 is an illustration of a data processing system or server where the invention is employed to communicate with wireless devices of clients over the Internet.

Figure 2:
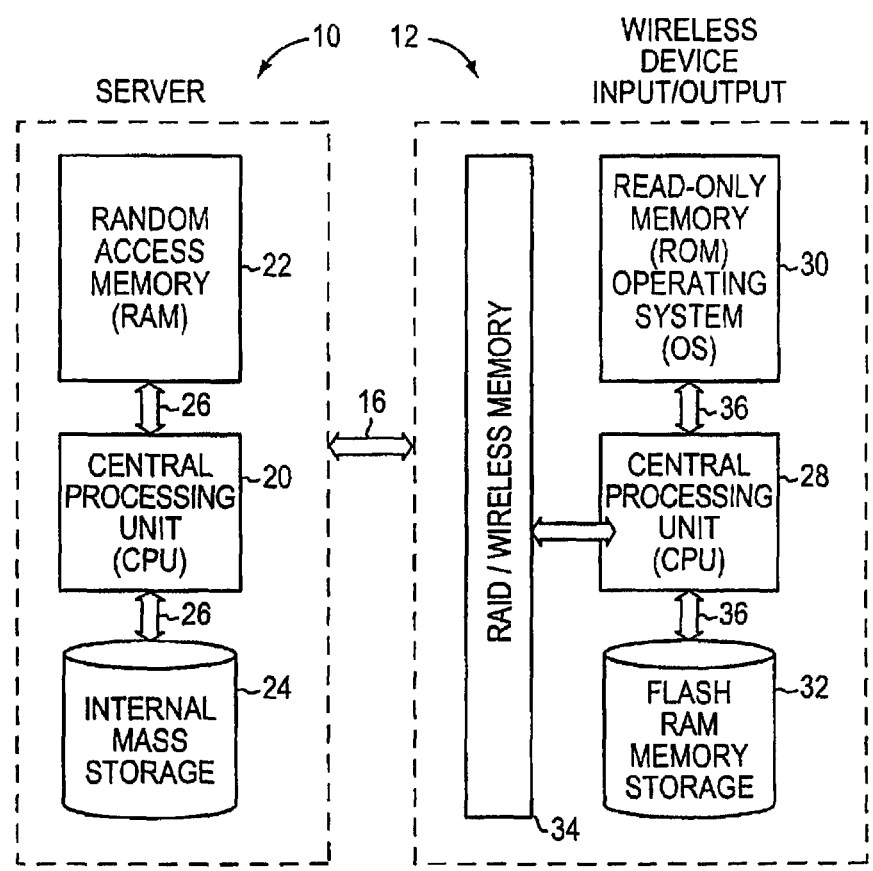

FIG. 2 is an illustration of a block diagram of the data processing system and wireless devices represented by FIG. 1.

Figure 3:
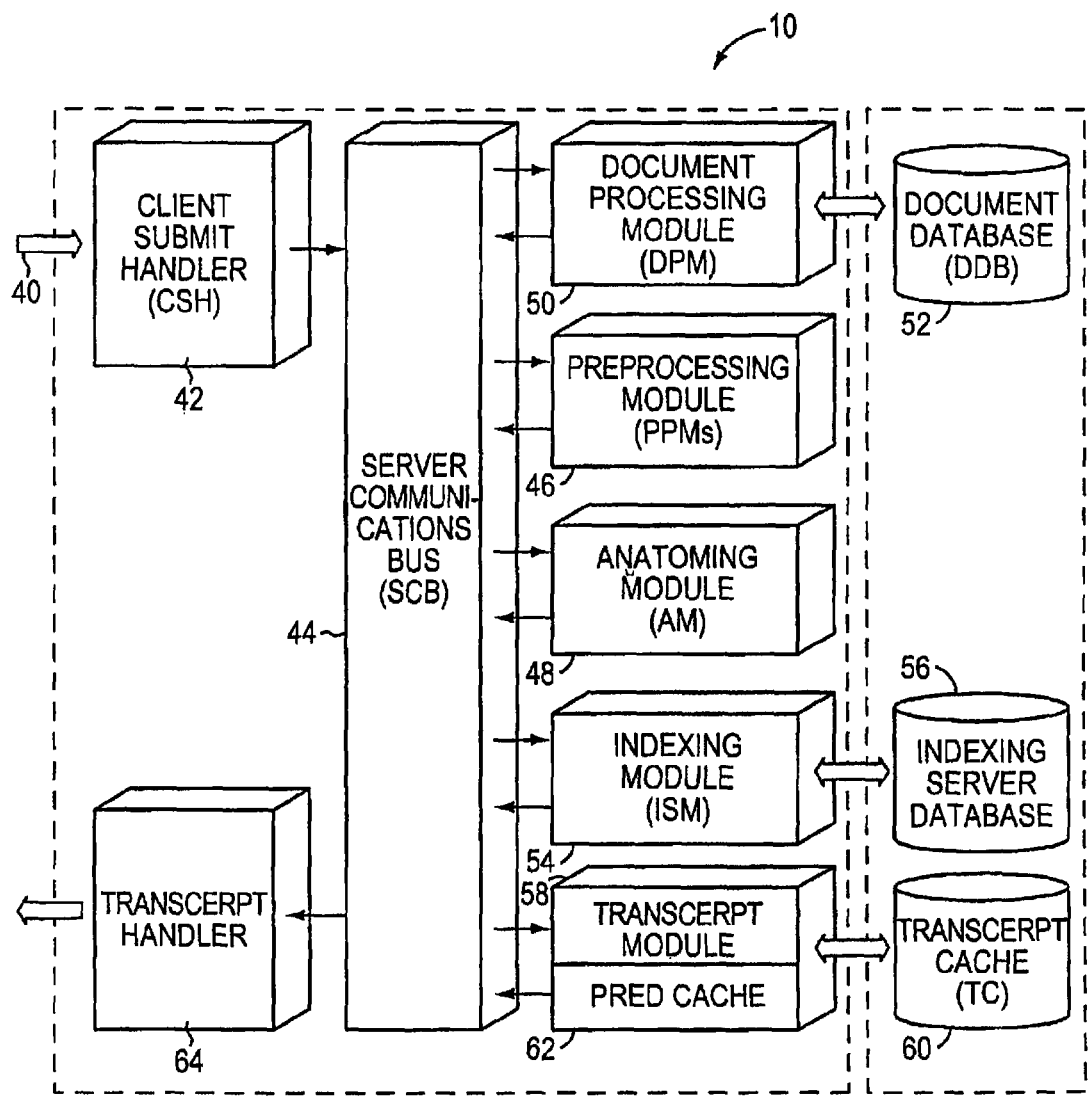

FIG. 3 is a block diagram illustration of the invention residing on the server in FIG. 1 detailing individual process modules of the present invention.

Figure 4:
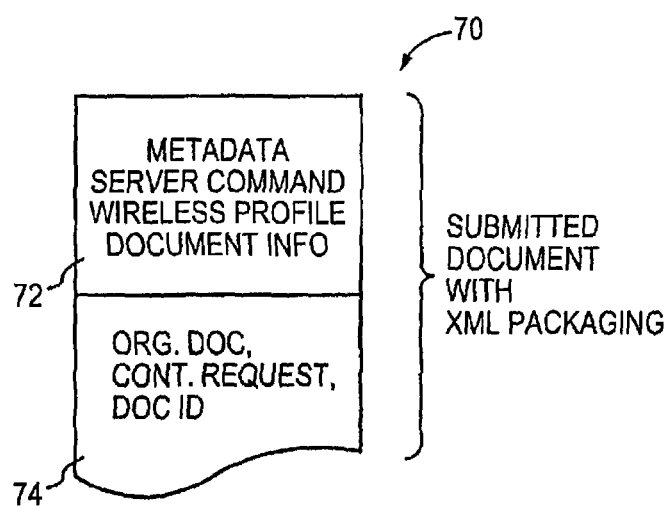

FIG. 4 illustrates the data packaging of a document submitted to the present invention.

Figure 5:
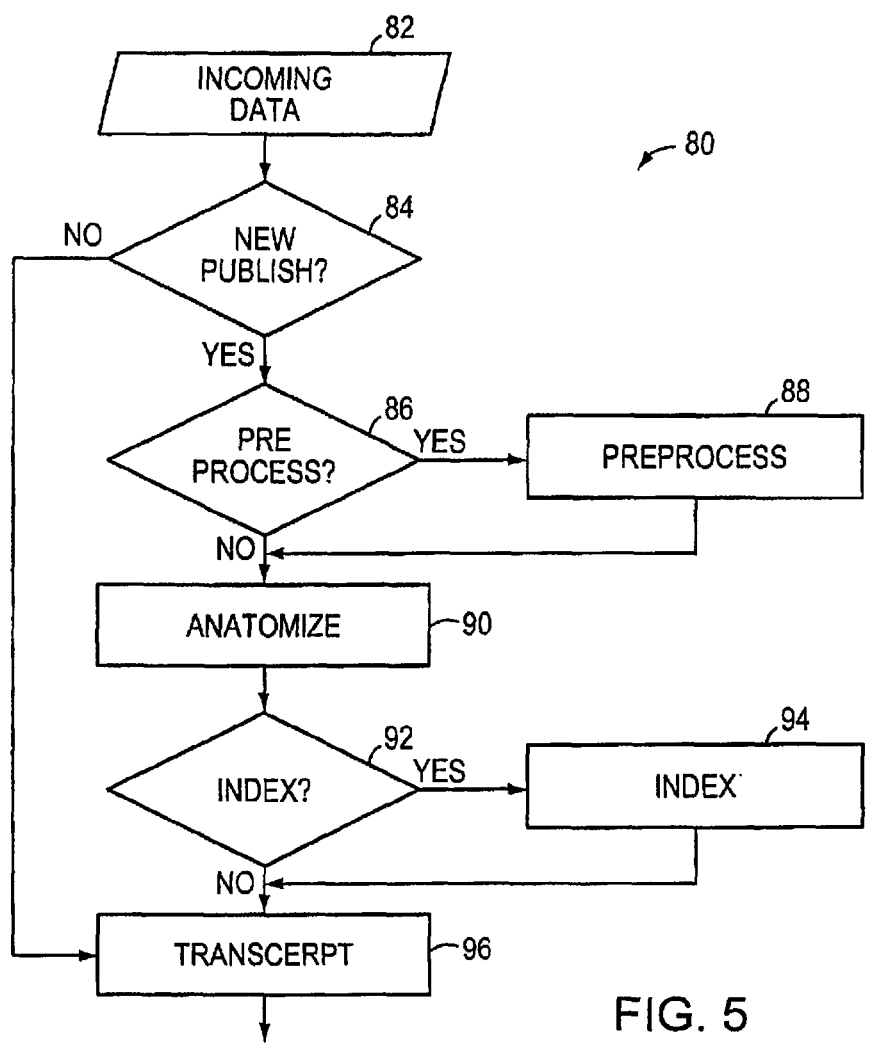

FIG. 5 is a flowchart illustrating the process flow of a submit request being processed by the data processing system on the server.

Figure 6:
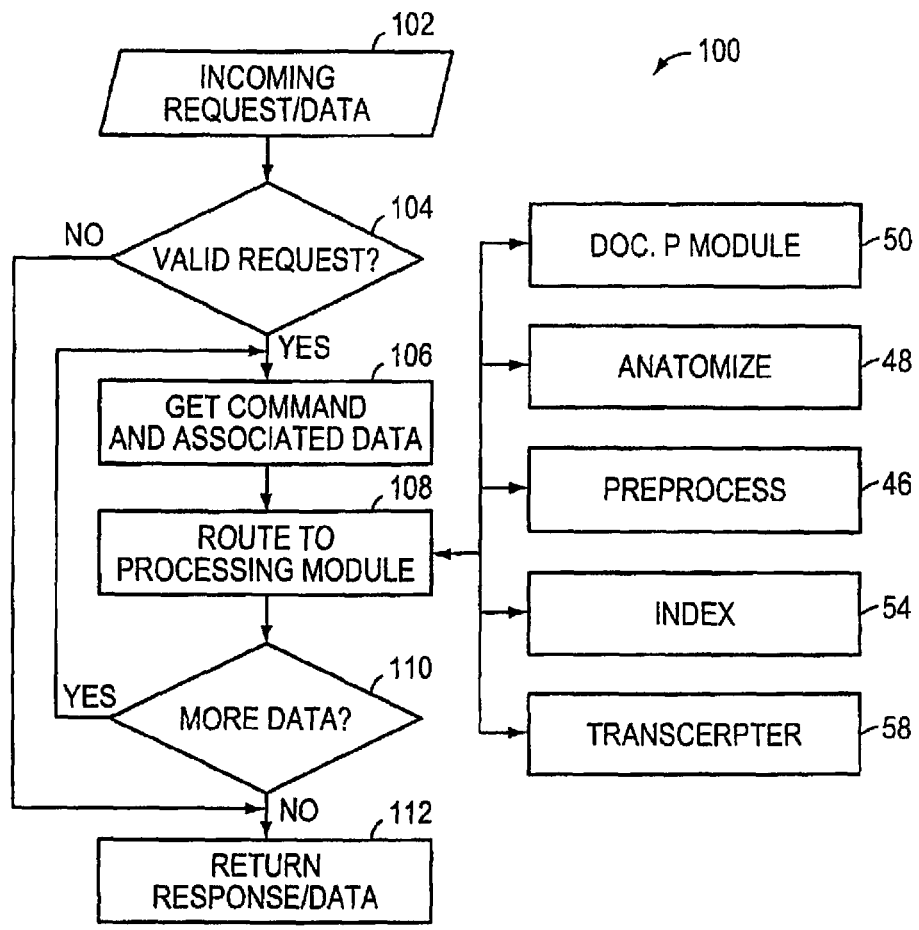

FIG. 6 is a flowchart detailing the process flow of an incoming request being processed by the Server Communication Bus (SCB) module of the server data processing system.

Figure 7:
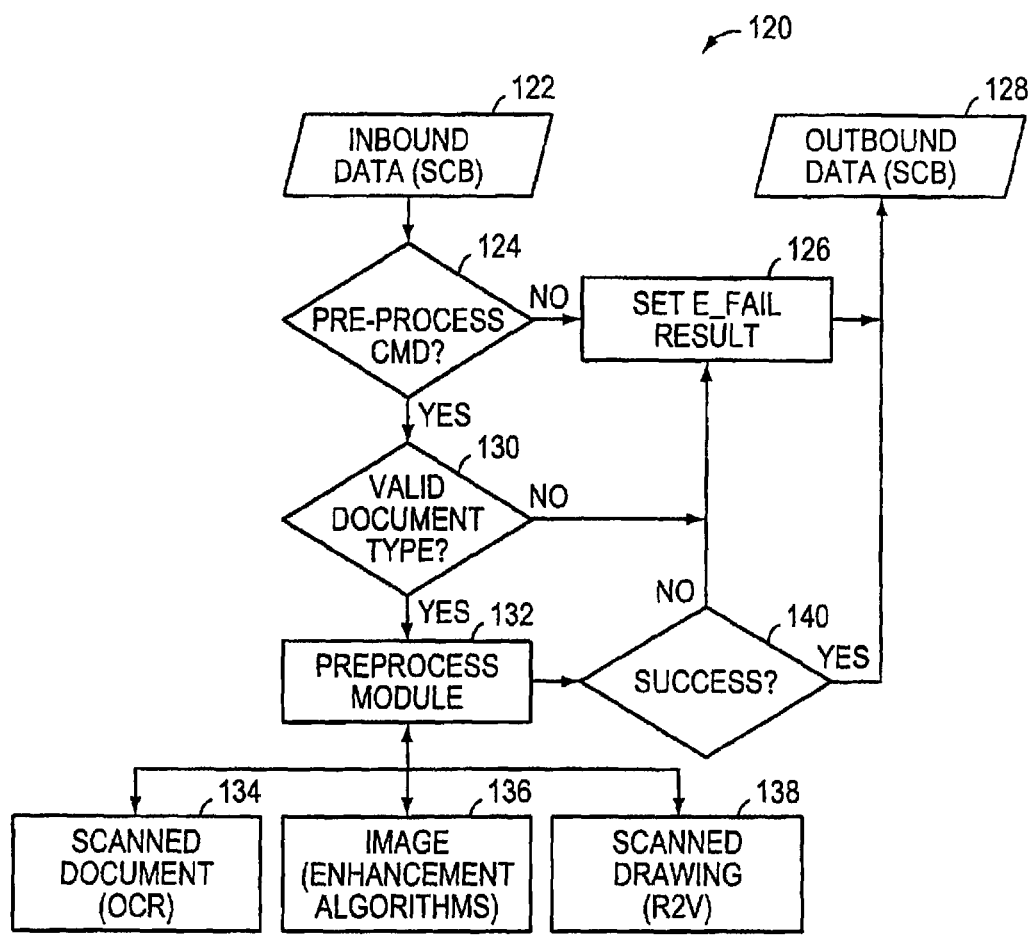

FIG. 7 is a flowchart detailing the process flow of a pre-processing module for invoking external processes for Optical Character Recognition (OCR), Image Enhancement and Raster to Vector conversion (R2V).

Figure 8:
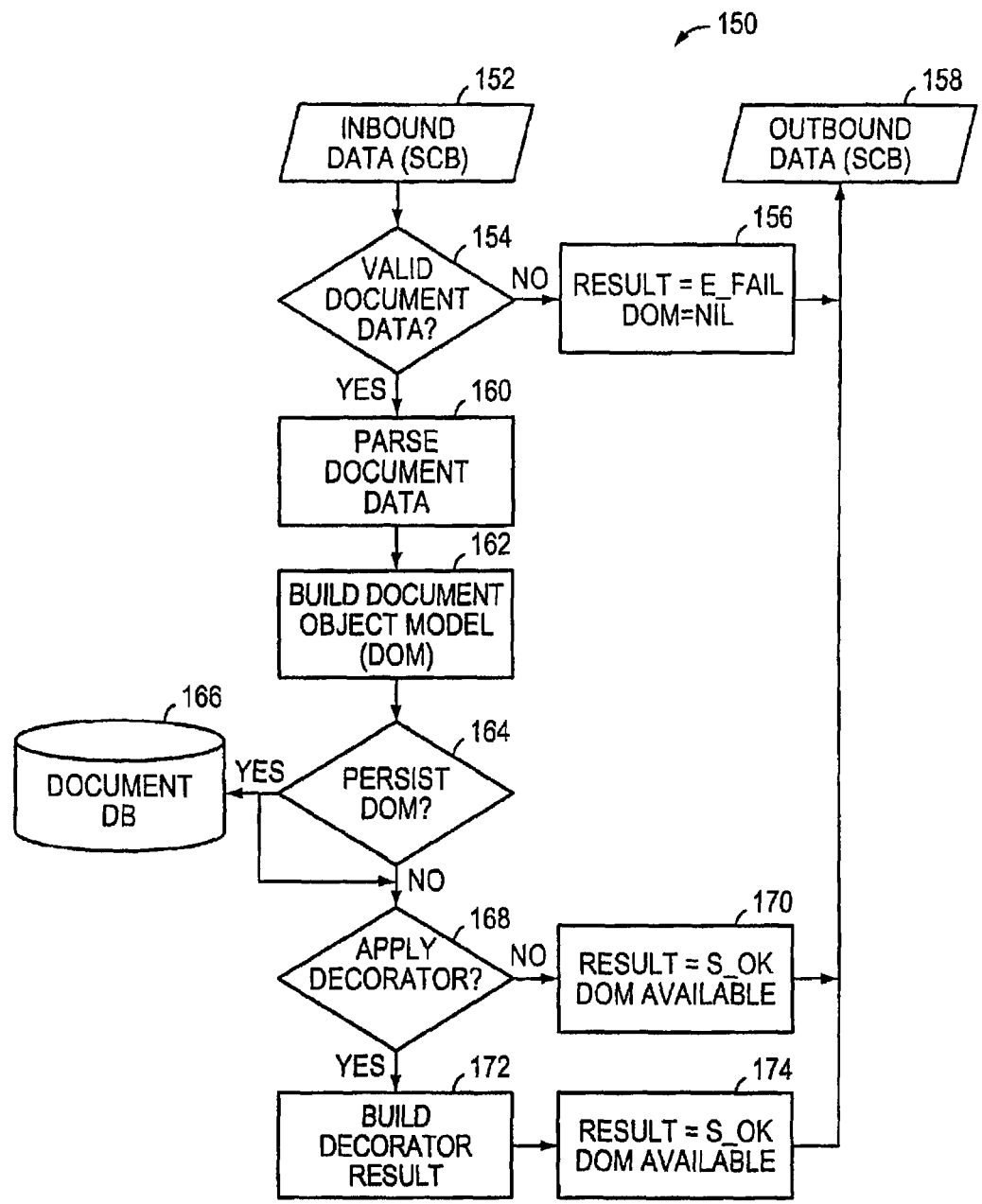

FIG. 8 is a flowchart detailing the process flow of a data processing system Anatomization module used to construct the documents anatomy in establishing the Document Object Model (DOM).

Figure 9:
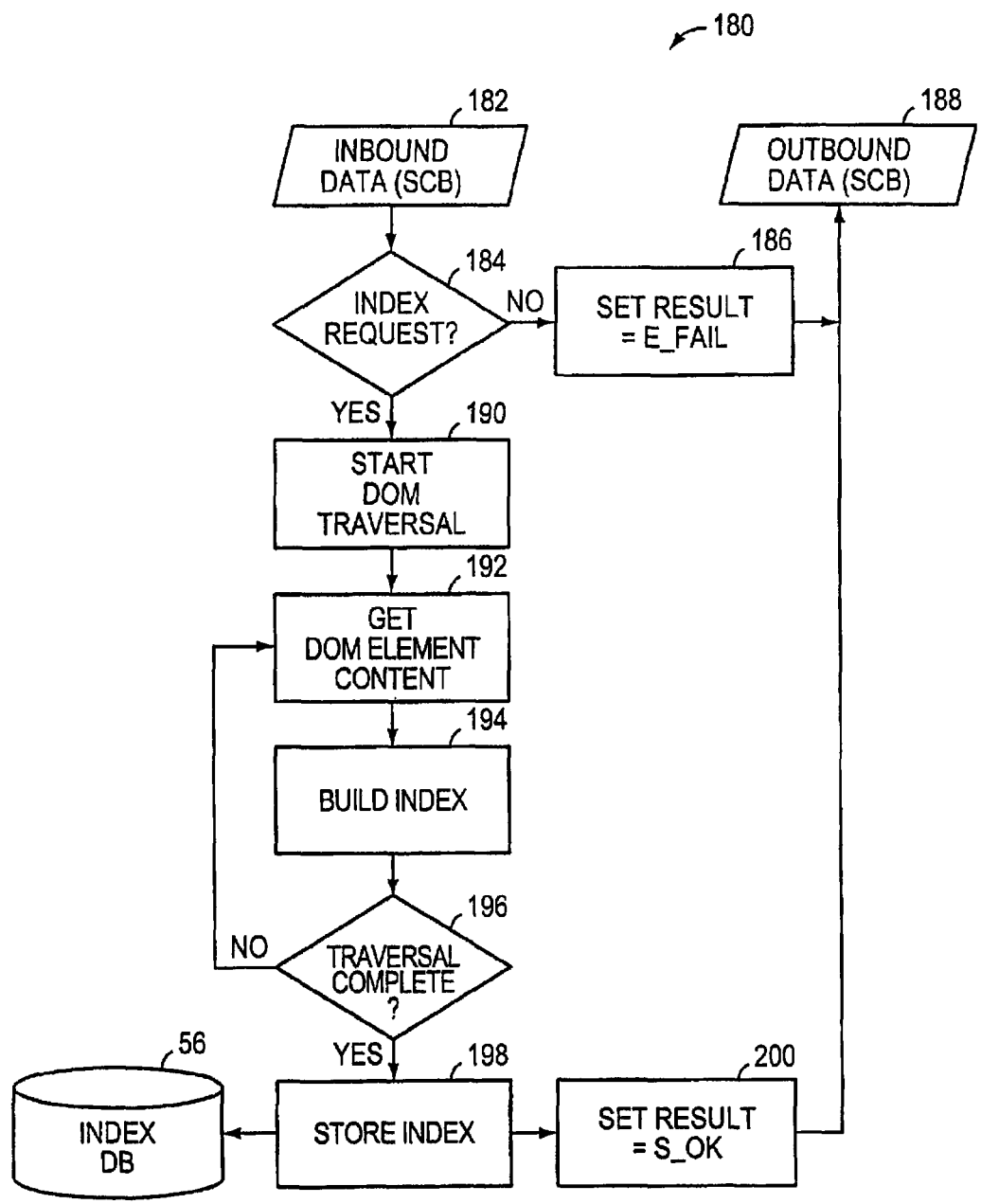

FIG. 9 is a flowchart detailing the process flow of an Indexing Module for indexing content of a submitted document.

Figure 10:
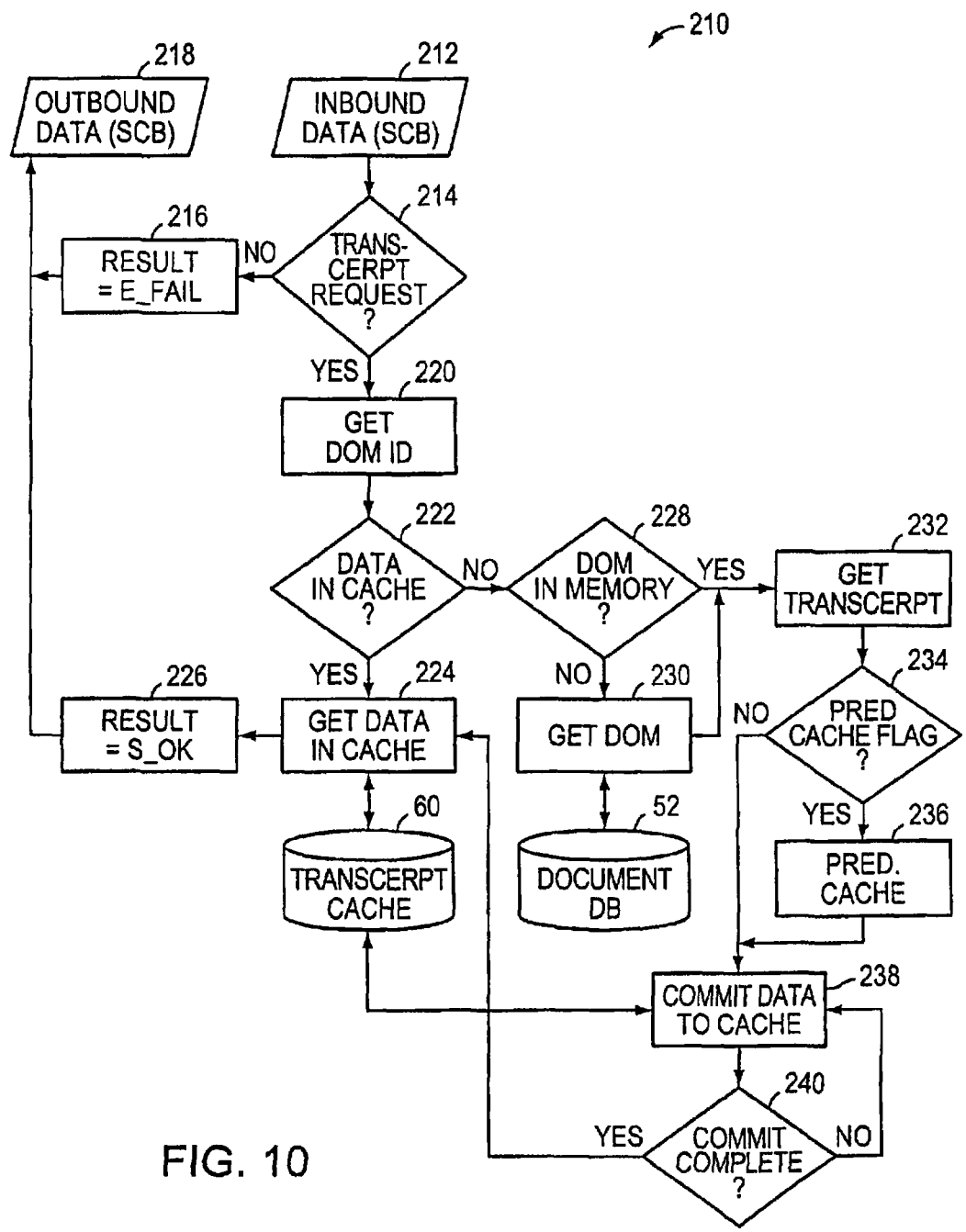

FIG. 10 is a flowchart detailing the process flow of a Transcerption Module of the invention for delivering the relevant content excerpts to the wireless/wired clients.

Figure 11:
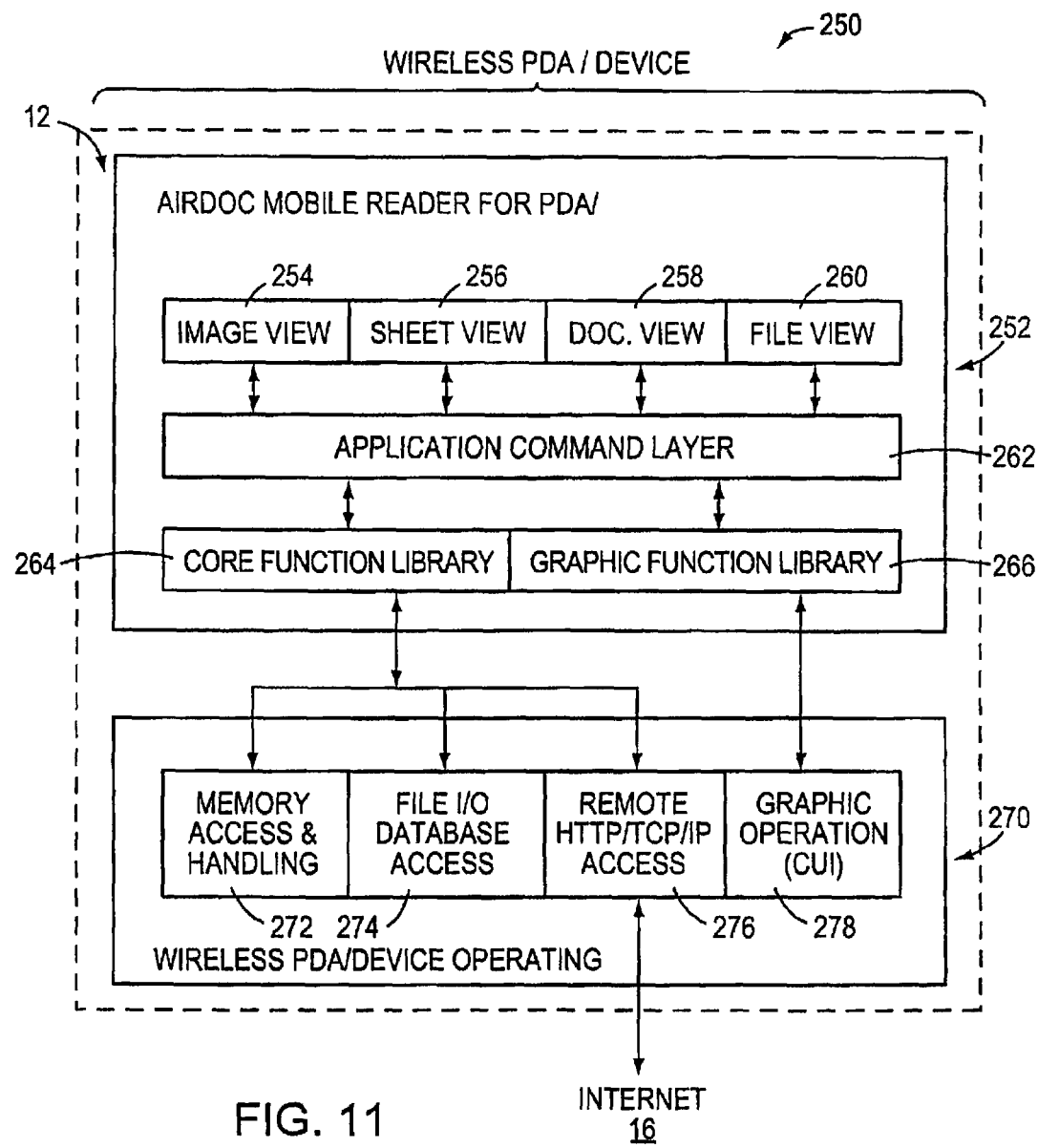

FIG. 11 is a block diagram illustrating the invention residing on a wireless device or client detailing the individual data processing modules.

Figure 12:
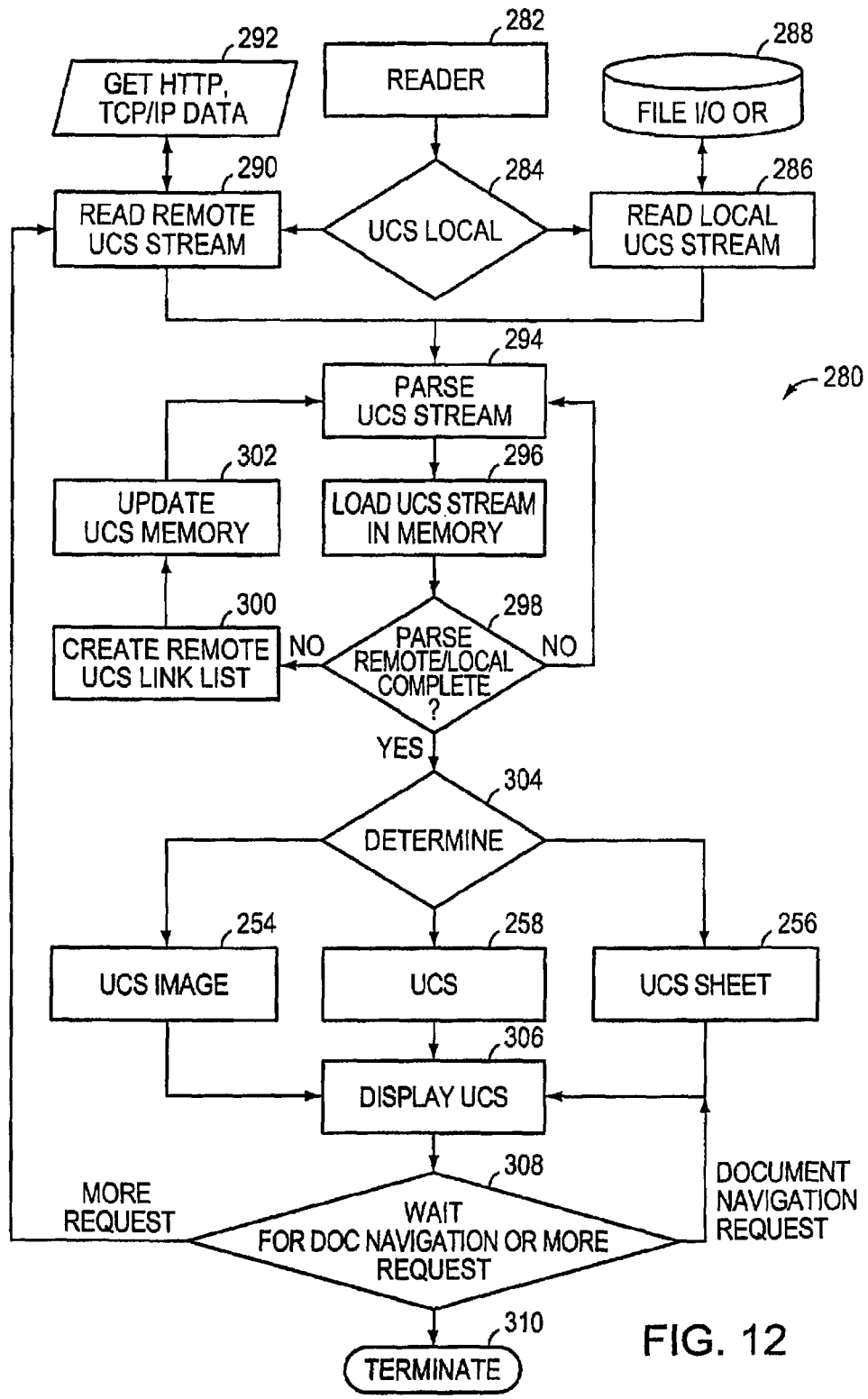

FIG. 12 is a flowchart detailing the process flow of the invention residing on a wireless device receiving transcerpted data in the form of the universal content stream (UCS).

Figure 13:
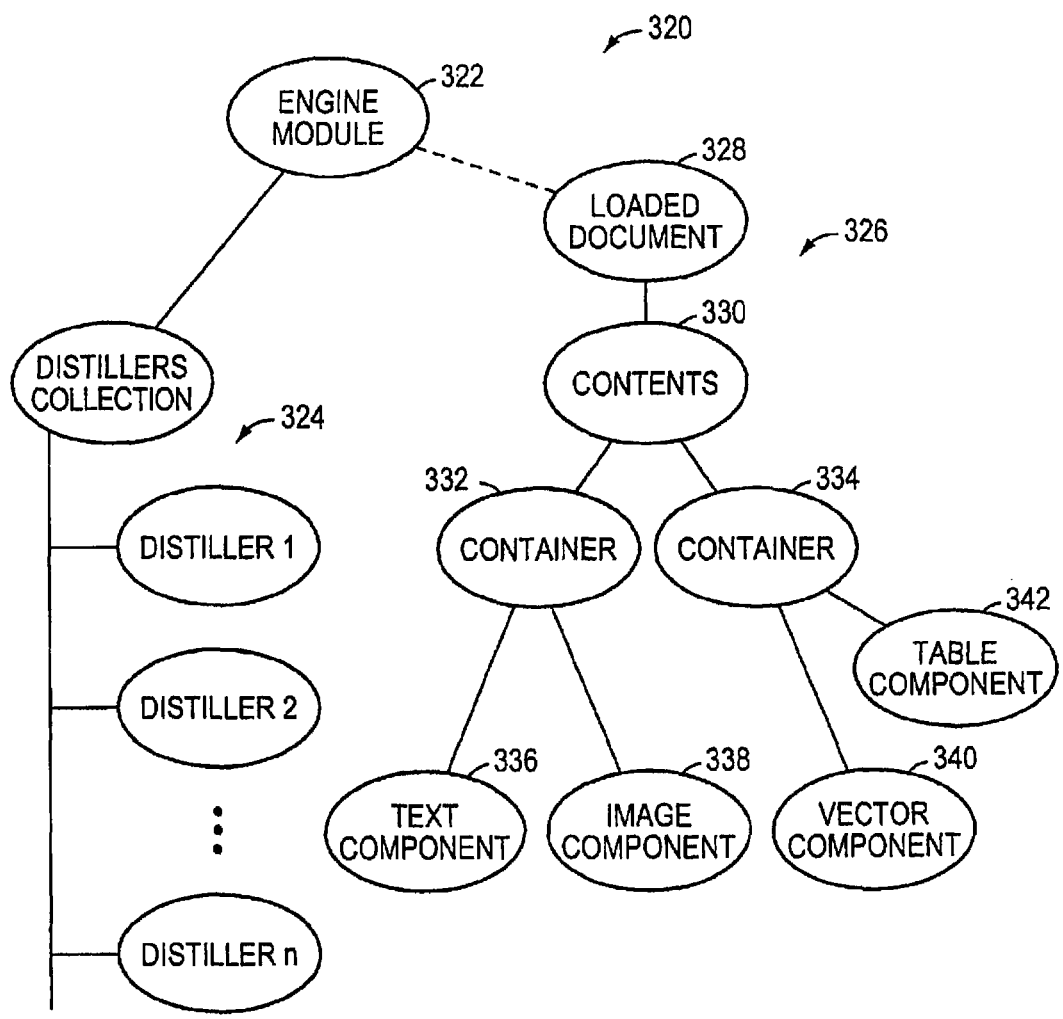

FIG. 13 is a diagram illustrating the architecture of the processing engine of the present invention with a loaded structured or unstructured document or data stream.

Figure 14:
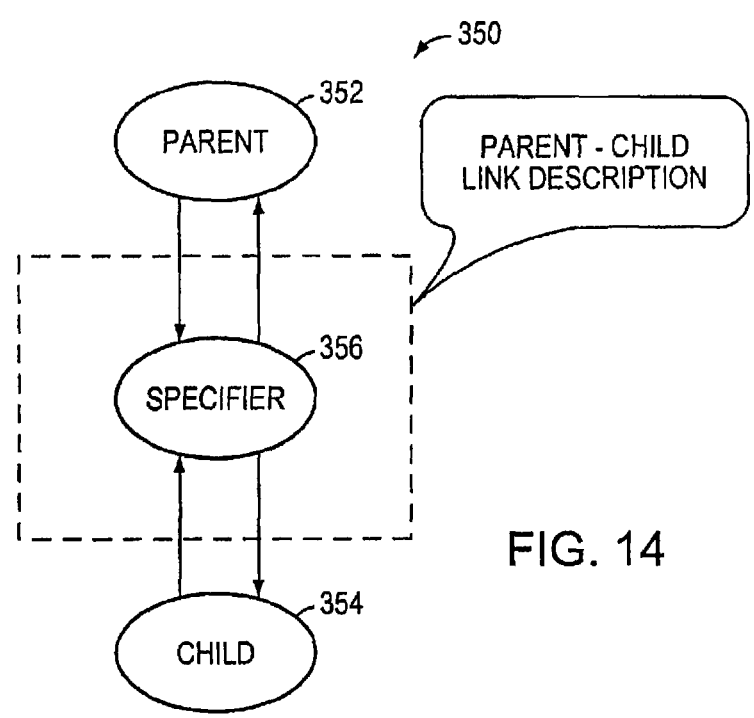

FIG. 14 is a diagram illustrating the relationship of a parent and child object in the invention of a constructed Document Object Model (DOM) for a loaded document.

Figure 15:

FIG. 15 is an illustration of a sample unstructured document with which the invention might be used.

Figure 16:
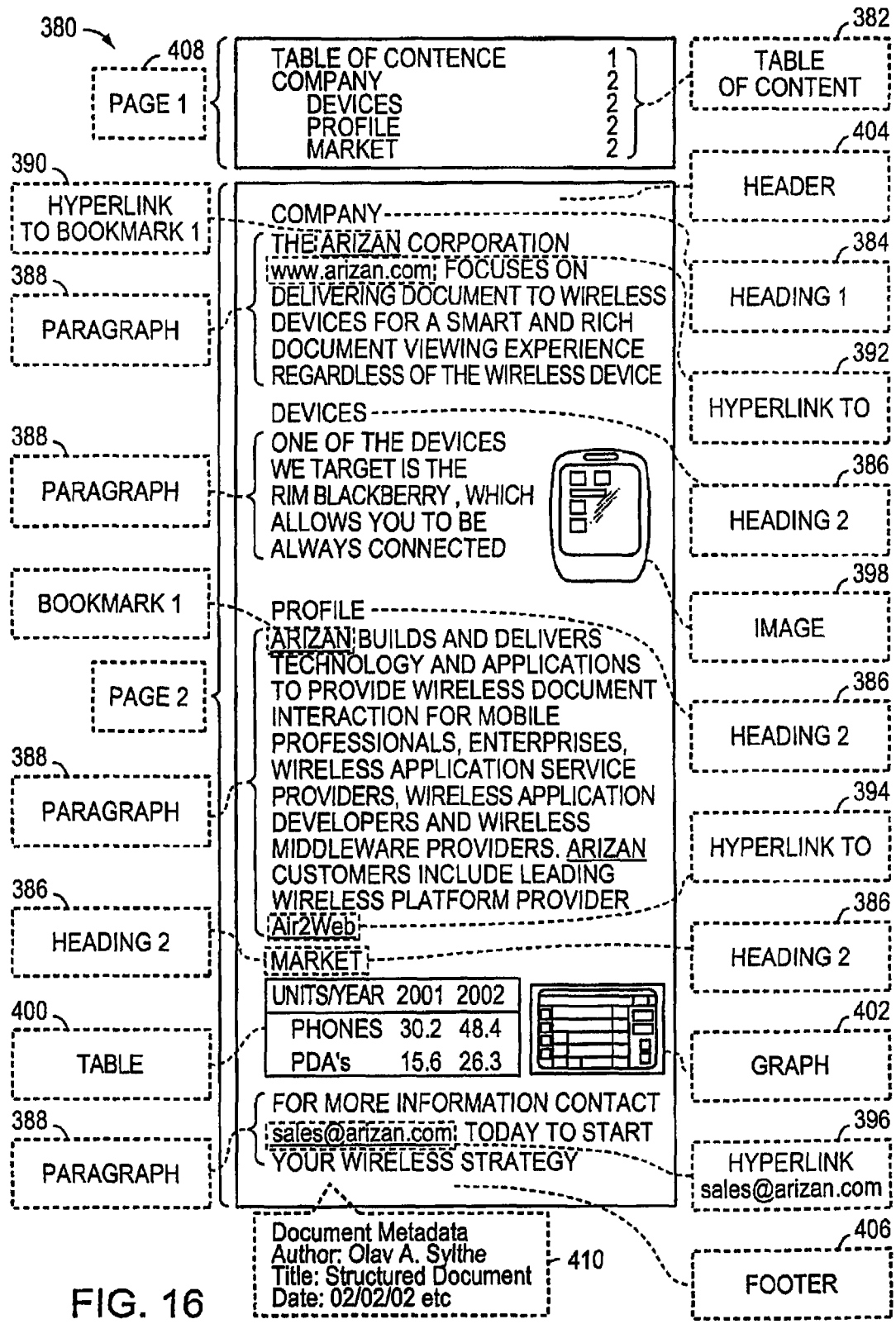

FIG. 16 is an illustration of a sample structured document with which the invention might be used.

Figure 17:
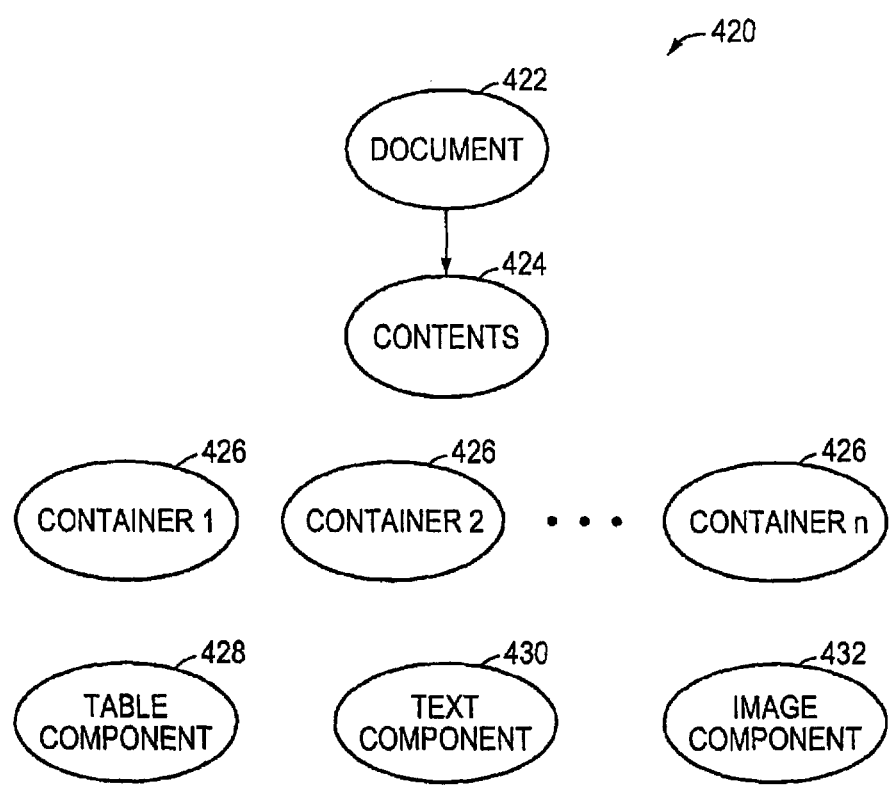

FIG. 17 is an illustration of the constructed Document Object Model (DOM) utilized by the invention for a loaded structured document.

Figure 18:
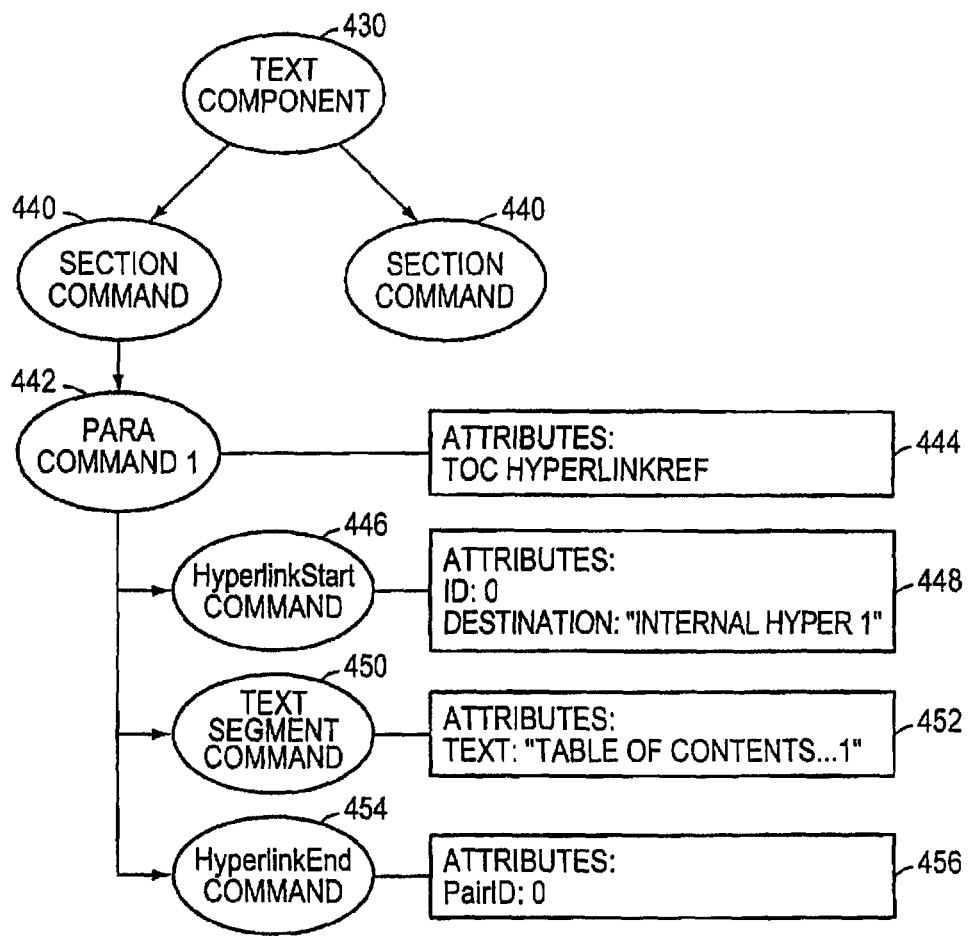

FIG. 18 is a diagram illustrating a Document Object Model of the present invention for textual content.

Figure 19A:
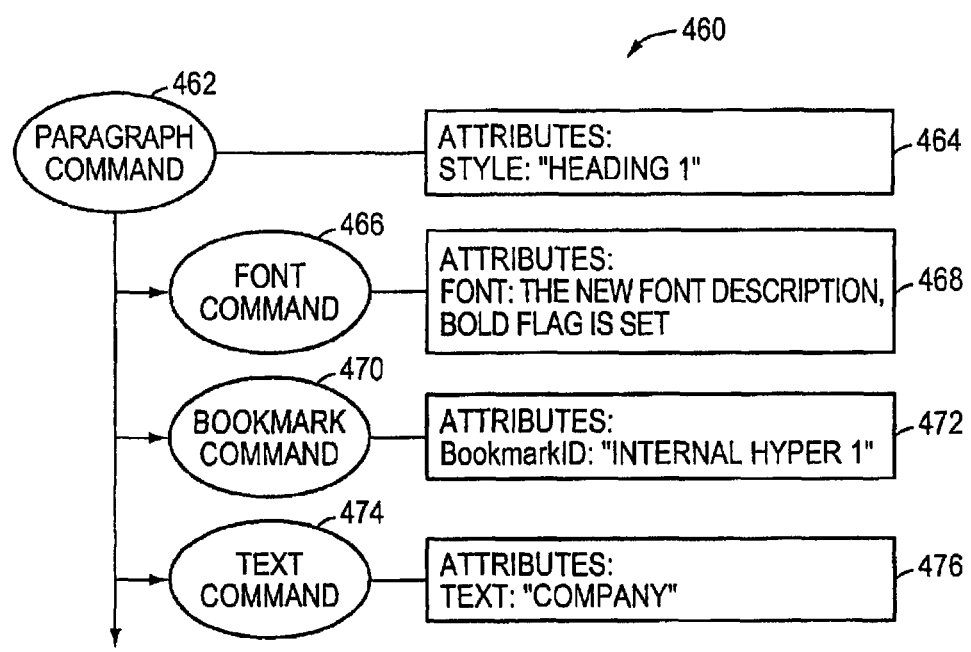

FIG. 19A is a diagram illustrating the inventions document object model in constructing a paragraph of textual content.

Figure 19B:
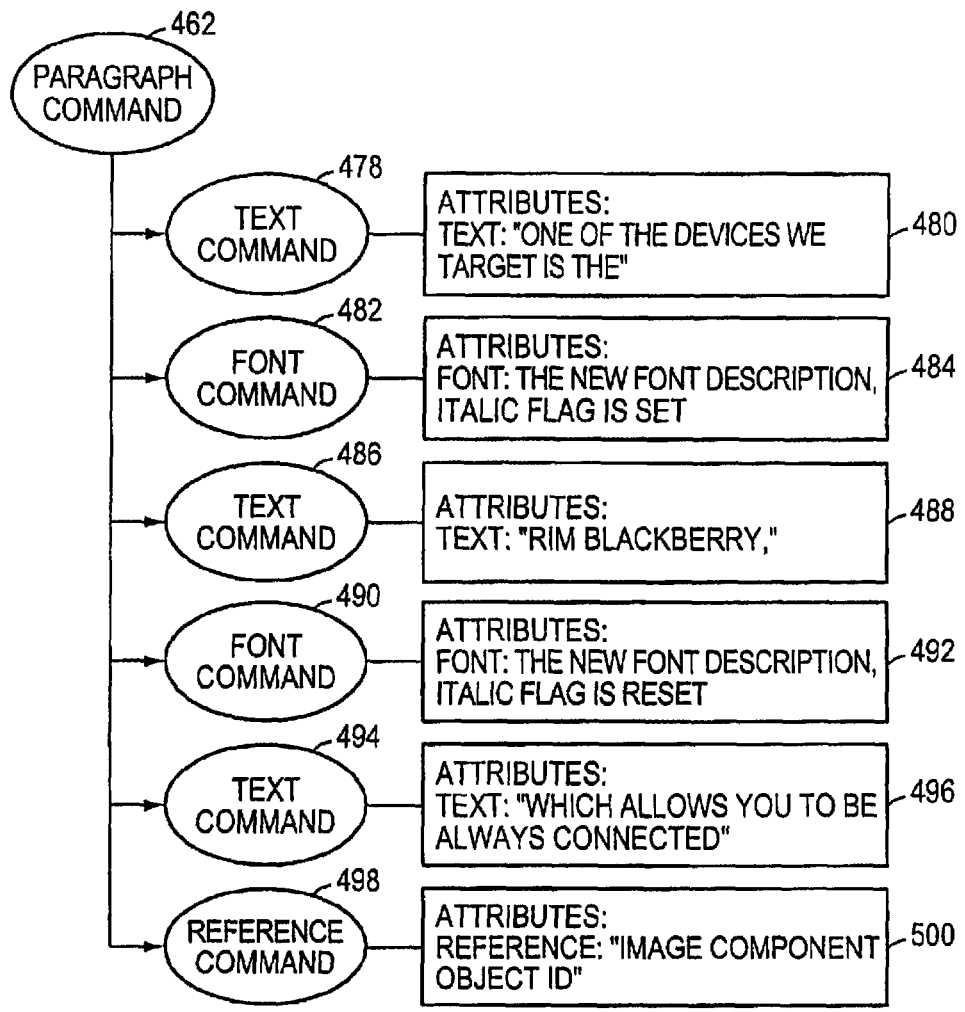

FIG. 19B is a continuation of illustrating the paragraph command in FIG. 19A.

Figure 20:
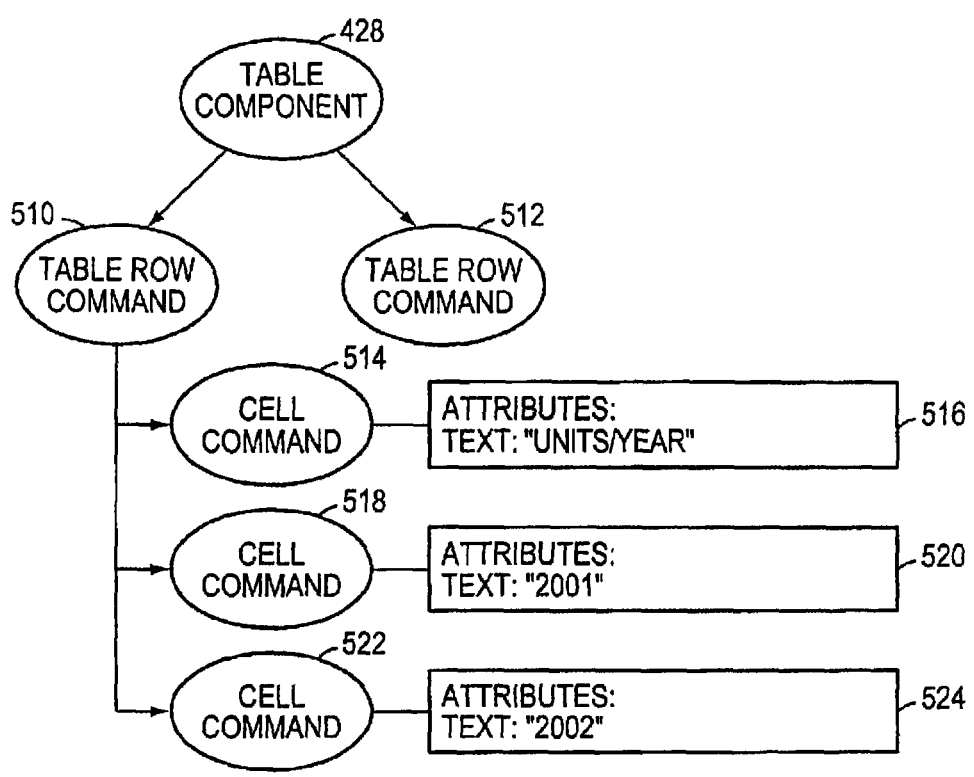
Figure 21A:
Figure 21F:
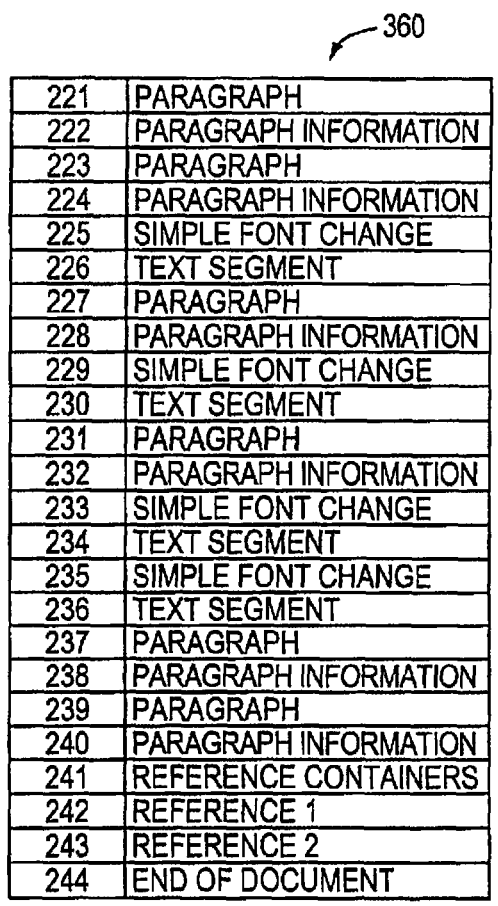

FIG. 20 is a diagram illustrating the Document Object Model for a loaded document containing table data as typically found in a spreadsheet document type.

FIGS. 21A-21F are illustrations detailing the command content of a transcept response from the invention to a wireless/wired device in the form of a Universal Content Stream data structure for a structured and unstructured document respectively.

Figure 22:
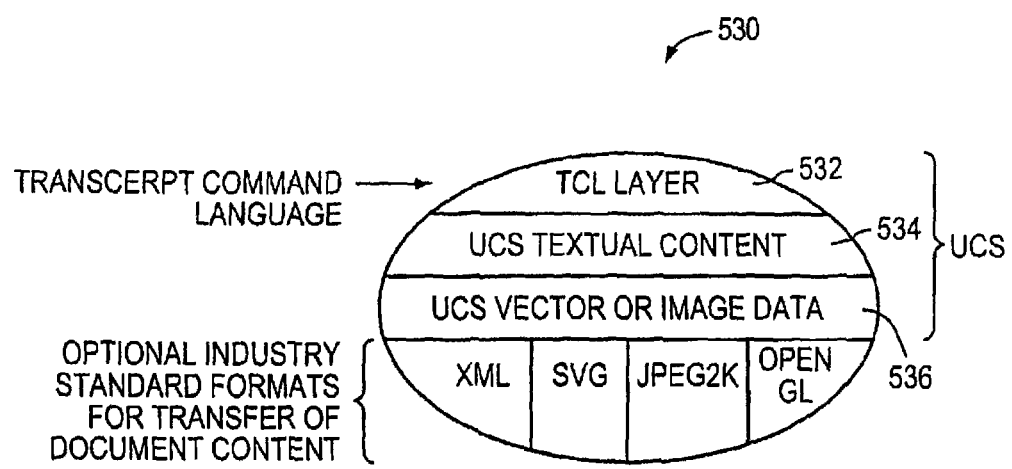

FIG. 22 is one embodiment of a layout for the communication format of the present invention.

DETAILED DESCRIPTION OF THE INVENTION

A data processing system or server 10 communicating with one or a plurality of wireless devices or clients 12 where the present invention can be utilized is illustrated in FIG. 1. The data processing system 10 typically includes conventional components, such as a central processing unit, internal mass storage, and random access memory, which are utilized by the present invention. Communication to and from the data processing system 10 will typically come through a secure software or hardware processing system/unit commonly known as a Firewall/Proxy Server 12 in a conventional manner to ensure authorized and valid access to the network in which the invention is deployed. The invention executing on the data processing system or server 10 will typically receive inbound and transmit outbound data via the Internet 16 to a portion of the invention residing on the wireless device or client 12. A current embodiment of the present invention can utilize as the data processing system 10 DELL, COMPAQ, SUN or other recognized manufacturers of server hardware running a Windows operating system release NT 4/2000/XP or higher or on a Sun Solaris operating system release 8 or higher.

FIG. 2 illustrates a more detailed overview of the data processing system or server 10 and the wireless device or client 12. The server 10 includes a central processing unit (CPU) 20, a random access memory (RAM) 22 and an internal mass storage device 24 all interconnected by a data channel commonly known as a bus 26. The data processing system 10 communicates with the wireless device client 12 over the Internet 16. The wireless device client 12 processing system includes a central processing unit (CPU) 28 designed for small footprint devices such as a Motorola Dragon Ball CPU, or the Intel StrongARM CPU coupled with a read only memory (RAM) 30 which stores a small footprint wireless device operating system such as Palm OS, or PocketPC OS with an internal flash ram memory storage 32 communicating with the Internet 16 utilizing a wireless radio/modem 34 all coupled together using a databus 36.

The data processing system 10 preferably is configured to execute and perform the functionality of the current embodiment of the present invention by having an operating system able to utilize data instructions written to execute using the functionality provided by the operating system to utilize typical programming languages such as C++ and Java.

FIG. 3 illustrates a block diagram of the process flow for the invention's server side processing modules of the present invention. A module by definition is an individual data process optional or obligatory that combined with other modules forms the invention's data processing system 10. A structured or unstructured electronic document or data stream 40 is submitted from the wireless or wired client side 12 and enters the server 10 from the network as binary data. A Client Submit Handler 42 receives the client request and verifies that this is a valid request and passes the received data with appropriate routing commands based on the client request over to a Server Communication Bus 44, which reads the routing commands and sends the received data to the required processing modules in the required order as indicated by the routing commands. If the first routing command is a request for a Preprocessing Module (PPM) 46 the received data is passed along for document or data optimization. The Preprocessing Module's 46 main purpose is to improve document quality for utilization by the invention if the document type is a scanned document containing imagery depicting textual content, containing binary imagery representing a picture, or a scanned document depicting a drawing using line or circular drawing elements.

For a scanned document containing imagery depicting textual content a technique known as Optical Character Recognition (OCR) is employed with the purpose of extracting the textual characters for processing by the invention. Any OCR style software package such as OmniPage from ScanSoft Corporation can be applied by the invention for this purpose. For imagery representing a picture the invention can apply commonly known image algorithms for improving image quality such as sharpen, blur, Gaussian blur, motion blur, intensity, contrast, gamma correct, invert, hue and saturation, histogram equalize, emboss, mosaic, median, average etc. For a scanned document depicting a drawing using line or circular drawing elements raster to vector (R2V) software is employed for the purpose of extracting drawing element and positioning information from the scanned drawing to reconstruct the submitted image as vector drawing data on the inventions wireless/wired client. Any R2V style software package such as VP HybridCAD from SoftTelec can be utilized by the invention for this purpose.

The Server Communication Bus 44 will then route the data 40 on to an Anatomization Module (AM) 48, which is responsible for establishing the anatomy of the document and to populate the Document Object Model (DOM) as described in FIG. 17 and will as a dependant process utilize the SCB 44 to route the data to a Document Processing Module (DPM) 50 where an Engine as described in FIG. 13 will load the structured or unstructured document using a distiller module. If the SCB's 44 routing commands include a command to persist (save) the document data parsed by the DPM 50 the document data will be saved in a Document Database (DDB) 52. The Document Database 52 is a connector to typical software packages commonly referred to as databases such as Microsoft SQL Server from Microsoft Corporation. Upon successful processing completion of the document by the DPM 50 the SCB 44 will issue a command back to the Anatomization Module 48 and the Document Object Model will be updated with the content and anatomy of the document. If an indexing request is part of the command stack of the SCB 44, an Indexing Module (ISM) 54 will be invoked and the textual content available from the Anatomization Module 48 of the document will be indexed using commonly known software products such as Microsoft Indexing Server and the results along with the associated references to the Document Object Module will be stored in an Indexing Server Database 56.

Upon completion by the ISM 54, the SCB 44 command stack will invoke a Transcept Module (TM) 58 (transcept= transmit excerpt) and the initial excerpt of content will be prepared for transmission by invoking the Anatomization Module 48 and requesting an initial Table of Content or Summary of the document based on the content available in the Document Object Module. Upon return of the transcept by the AM 48, a copy of the initial transcept will be placed in a Transcept Cache (TC) 60 for repeat access purposes. If the SCB 44 command stack contains a Predictive Caching Module 62 request, the AM 48 will be repeatedly invoked for the lifetime of the client session with the purpose of predicting future client requests for related content data from the document. The Predictive Caching Module 62 will, for the lifetime of the client session, then populate the Transcept Cache 60 with the transcept results from the Transcept Module 58. The initial transcept is then upon completion from the TM 58 returned via the SCB 44 to a Transcept Handler 64 where the correct client device 12 for the return data is identified and the transcept is sent to the network 16 and back to the wireless/wired client 12.

If the Client Submit Handler 42 receives a client request for more content from a previously submitted document it passes the request over to the Server Communication Bus 44, which in turn hands it off to the Transcept Module 58, which will then look into the Transcept Cache 60 to see if a transcept generated by the Predictive Caching Module 62 is available for transmittal. If not, the Anatomization Module 48 will be invoked and a new transcept will be prepared following the procedure as described for documental submittal for the System 10. Upon completion the transcept will be placed in the Transcept Cache 60 and the Trancept Handler 64 again will be invoked and deliver the transcept to the client wireless/wired device 12 as described for the initial document submittal.

FIG. 4 represents the packaging of a document or content request 70 submitted for publishing by the present invention. An XML based metadata description 72 is the encapsulation of the packaging and will contain the appropriate server command such as publish or query, wireless device profile of the requesting device 12 providing information such as device type, device screen size, free storage space, estimated bandwidth transfer speeds etc. and information on the document 70 such as document name, document date, document type or any other supplemental information. An Original Document or unique document ID 74 for the content request 70 makes up the other part of a document submittal request. If an original document is part of the submitted request the document will be published or republished if required. If a unique document ID is sent as part of the request it indicates that the document is already published and the server will look in the Transcept Cache 60 or retrieve the document from the Document Database 52 based on the unique Document ID.

FIG. 5 illustrates a flowchart process 80 for a wireless client 12 submit request to the data processing system server 10. An incoming request 82 with data has arrived. The first step of the process 80 is to establish if this is a new publish request 84. If it has a unique document ID 74, it is not a new publish request (NO) and the document already resides on the server data processing system 10, then a Transcept processing step 96 will take place directly. If an original document is being submitted, the metadata 72 is processed to see if there is a client request to perform Pre Processing 86 and the PreProcess module 46 will be invoked in a step 88. If not, the Anatomization process 90 will be performed. Upon process completion from the Anatomization process module 48 the metadata 72 is processed to see if there is a client request to perform indexing 92 on the anatomized content. If this is true, then the Index Processing Module 54 is invoked and the content will be indexed in a step 94. Upon completion of step 92 and/or step 94, the Transcept module 58 will be invoked in a step 96 with the purpose of delivering the initial content result back to the requesting wireless client 12.

FIG. 6 is a flowchart 100 illustrative the data flow of the server side data processing system 10 of the Server Communications Bus 44 (SCB). An incoming request and/or data is received 102 by the SCB and the SCB looks to determine if this is a valid request 104 for the SCB 44. If the request is valid (YES), the command and associated data is retrieved 106 by the SCB. Associated data will be an original document or original document unique ID. Pending on the SCB command the data will be routed 108 to the appropriate processing module where any single or combination of SCB commands will be performed by the server side data processing system 10 including any of the system modules; the Document Processing Module 50, the Anatomization Module 48, the Preprocessing Module 46, the Indexing Module, and the Transcerpter Module 58. As the SCB 44 is designed to process both asynchronous or synchronous request requests for data processing by the individual data processing system modules 46, 48, 50, 54, 58 the requests may or may not be completed when the SCB 44 will check if there are additional commands and data to be processed in a step 110. If there are more commands or data (YES) the process will continue again with the step 106 until the command stack is emptied. If no more data or commands are pending in the step 110, the SCB 44 will return the appropriate response and resulting data from the server side data processing modules in a step 112 to the requesting wireless/wired client 12. If no valid command is detected by the SCB in the step 104 (NO) the appropriate failure code will be assigned by the step 112 and the resulting return or response will be sent to the requesting wireless or wired client 12.

FIG. 7 illustrates a flow chart 120 describing the server side data processing system for the Pre Processing Module 76. Inbound Data 122 is received on the SCB 44. A validation step 124 is performed to see if this is a valid Pre-process command. If the command is not recognized as a valid pre-process command (NO) the result error code is set to E_FAIL in a step 126 and the error code is returned as outbound data on the SCB in a step 128. If the step 124 determined that the command is a valid preprocess command (YES), a step 130 checks to see if the document type submitted with the preprocess command is a valid supported document. If the answer is negative (NO) the step 126 again sets the result error code to E_FALL and the error code is returned as outbound data on the SCB in the step 128. If it is determined that this is a valid document type (YES) in the step 130, then the Preprocess module 46 is invoked in a step 132. Based on the document type determined as part of the successful step 130, an appropriate preprocessing sub module 134, 136 or 138 is invoked. Step 134 performs an Optical Character Recognition (commonly referred to as OCR) to convert a scanned document into textual content. The invention is designed to use commercially available software for OCR purposes from software vendors such as OmniPage from ScanSoft Corporation.

Step 136 is invoked by the step 132 if the valid document type determined in the step 130 is an image or picture data in saved form such as BMP (Bitmap) or JPEG (Joint Photographic Experts Group) upon which commonly known mathematical formulas can be employed to improve the visual aspects of the image picture data such as sharpen, blur, Gaussian blur, motion blur, intensity, contrast, gamma correct, invert, hue and saturation, histogram equalize, emboss, mosaic, median, average etc. A step 138 is invoked by the step 132 if the valid document type determined in the step 132 is a scanned drawing depicting a drawing using line or circular drawing elements. A step 138 will then employ commercially available raster to vector (R2V) software for the purpose of extracting drawing element and positioning information from the scanned drawing to reconstruct or recreate the submitted image as vector drawing data on the wireless/wired client 12.

Any R2V style software package such as VP HybridCAD from SoftTelec can be utilized by the present invention for this purpose. Upon completion of any sub process 134, 136, 138 by step 132 then a step 140 will check if the process is determined to be successful. If the step 140 is a success (YES), the preprocessed data will be returned back to the SCB in the step 128. If the step 140 determines that the result from the step 132 is unsuccessful (NO), the result error code is set to E_FAIL in the step 126 and the error code is returned as outbound data on the SCB in the step 128.

FIG. 8 is a flow chart 150 illustrating the process flow of the server side data processing system 10 for the Anatomization process 48. Inbound data from the SCB is received in a step 152, which is passed to a step 154 where it is determined if the document data is valid or not. If the document data is invalid (NO) a step 156 sets the result error code to E_FAIL and the pointer to the DOM is set to equal zero or NIL, and returns the error code as outbound data on the SCB in a step 158. If it is determined that the document data is valid (YES) in the step 154, the document data received will be parsed in a step 160 and the Document Object model (DOM) then is built up in a step 162. After the DOM has been constructed by the step 162, then a step 164 will check if there is a command request to persist or store the constructed DOM. If the step 164 is true (YES) the DOM data will be stored in the Document Database 52 in a step 166 before continuing on to a step 168. If the step 164 is false (NO), then the step 168 will check to see if there is a command to apply a decorator. A decorator is a command to traverse the Document Object Model established by the step 162 and extract content or navigational information such as a Table of Content (TOC), Bookmarks, Hyperlink, Find Text etc. If the step 168 has no decorator command to apply (NO), a step 170 will set the result code to S_OK and set the DOM pointer before returning the outbound data in the step 158. If, the step 168 determines that decorators are to be applied (YES), a step 172 is invoked and the decorators will traverse the DOM established in the step 162. Upon completion of the step 172 the result code is set to S_OK and the DOM pointer is set in a step 172 before returning the outbound data in the step 158.

FIG. 9 illustrates a flow chart 180 of the Indexing Process 54 for the server side data processing system 10. Inbound data from the SCB 44 arrives in a step 182. A step 184 checks if there is a request to index the data. If the step 184 is determined to be false (NO), then a step 186 will set the result code to E_FAIL and the result will be returned as the outbound data to the SCB in a step 188. If the step 184 is true (YES), then the system will start to traverse the Document Object Model (DOM) in a step 190. In a step 192 the content of a single DOM element is retrieved and then the system 10 will start to build the Index in a step 194. In the step 194 the system will typically employ commercially available software indexing packages such as Microsoft Indexing Server. After the content of the retrieved DOM element has been indexed in the step 194 then a step 196 checks to see if the DOM traversal is complete. If the answer is NO, then the steps 192 and 194 will again be processed until the DOM traversal is complete (YES) in the step 196. The index is then stored in a step 198 in the Index Database 56 and the result code is set to S_OK in a step 200 before the result is returned as the outbound data to the SCB in the step 188. The Index DB 56, utilized in the step 198 can be any commercial database product such as MS SQL Server or Oracle.

FIG. 10 is a process flowchart 210 of the Transcerption module 58 for the server side data processing system 10. Inbound data arrives from the SCB in a step 212 and the data is checked to see if this is a transcerpt request or not in a step 214. If it is not a transcerpt request (NO), then a step 216 will set the Result code to E_FAIL and pass the result back to the SCB in a step 218 as outbound data. If the step 214 determines that the data is a transcerpt request (YES), then a step 220 is invoked to obtain the ID of the Document Object Model. The DOM ID is used to identify the correct document either from the transcerpt cache 60 or from the Document Database 52. A step 222 checks to see if the data is available in the cache 60. If the answer is YES, then a step 224 will get the data from the transcerpt cache 60 and a step 226 will set the result to S_OK and return the outbound data in the step 218 onto the SCB. If there is no data in the cache (NO), during the step 222 then a step 228 will see if there is a DOM loaded in the memory and if it matches the DOM ID.

Because the system 10 employs caching it will typically retain the DOM and DOM ID for a specified number of documents, such as the last 32 processed documents and if the DOM ID matches any of the DOM content in the cache it will be put back in memory unless it's already there, meaning it was the last document processed. If the test in the step 228 determines that there is no DOM in memory or the DOM ID does not match (NO) (meaning the DOM is not in the cache) then a step 230 is invoked, which will retrieve the DOM from the Document Database 52 before proceeding with a step 232. The system 10 allows the DOM to be saved to a database or file for immediate retrieval without having to reprocess the original document used to create the DOM initially. If the step 228 determines that there is a DOM in memory and the Document ID matches (YES), then the step 232 is invoked to get the transcerpt. A step 234 then looks to verify if the SCB command received in the step 212 as inbound data from the SCB has the Predictive Caching Flag set. If the flag is set (YES), then a step 236 will start the asynchronous Predictive Caching process 62 before proceeding with a step 238. If the step 234 determines that the flag is not set (NO), then the step 238 is invoked and the transcerpt data retrieved in the step 232 will be committed to the cache 60. A step 240 will then test repeatedly to see if the commit is complete, returning back to the step 238 if the test results in a negative (NO). When the step 240 returns true for commit complete (YES) then step 224 is invoked and the transcerpt data is retrieved from the cache. The step 226 will set the result to S_OK and return the outbound data in the step 218 onto the SCB.

FIG. 11 is a detailed diagram 250 of the present invention wireless client processing system residing on a wireless device or Personal Digital Assistant (PDA) 12. A reader 252 is a software application including a plurality of individual software function elements and libraries 254 through 266 that makes function calls to a Wireless PDA/Device operating system 270. The operating system 270 includes a plurality of individual software functions forming the operating system 270. Commonly known operating systems (OS) for wireless PDA/devices are Palm OS by Palm Corporation, Windows CE by Microsoft Corporation, J2ME by Sun Corporation, EPOC by Symbian and BREW by Qualcomm. The inventions client side software functionality is designed to read the defined Universal Content Stream, also commonly referred to as UCS. The reader 252 has the Graphic Function Library 266 that offers a set of graphical instructions used to render textual, vector and image-based data on the device 12. To accomplish this the library 266 uses available graphics operations 254 from the device OS 270. The Core Function Library 264 offers a set of functions derived from the device OS 270 for the memory access and handling 272, the file input/output and/or database access 274, and the wireless data access 276 for retrieving data from the Internet 16. The reader 252 then has the application command layer 262 that invokes the core library 264 and the graphic function library 266 to be able to offer a graphical user interface GUI as defined in the view modes 254, 256, 258 and 260.

Based on the data loaded from the UCS the Image View 254 will display image or picture based data, the Sheet View 256 will display spreadsheet data in a spreadsheet style grid, the Document View 258 will display textual content in a rich and intuitive way and the File View 260 will display a user interface for loading and saving the UCS file on the device 12. The layered design in the reader 252 is designed so that only the core function library 264 and the graphics function library 266 will be different on each wireless/pda device 12 on which the client side processing system is deployed on. This allows the invention to be quickly moved or ported to different operating systems such as Palm OS, Windows CE, J2ME, EPOC and BREW where the two primary programming languages are Java and C++ as commonly know by those skilled in the art of programming. A USC binary file is delivered to the device 12 from the server side data processing system 10 over the Internet 16 and the wireless client reader 252 retrieves this data by using the functions for wireless data access (load) 276 in the core function library 264, which in turn calls the library for remote HTTP/TCP/IP access 276 of the wireless PDA/device OS 270.

FIG. 12 is a detailed flowchart 280 of the client side processing application residing on the wireless PDA/devices 12. In a step 282 the reader 252 is invoked either by being launched by another application on the device 12 such as the Inbox application or by the user selecting the application icon for the reader and invoking it. In a step 284 the passed Universal Content Stream (UCS) if any, will be verified to be local or remote. If local then the UCS is already stored on the device 12 and a step 286 will read the local UCS stream from a file or database 288. If the UCS is determined to be remote in the step 287 (not residing on the device 12) then a step 290 is invoked to read the remote UCS stream. A step 292 will then obtain the remote UCS residing on the server side data processing system 10 using the Internet 16. Upon completion of either step 286 or 290 the execution will continue with a step 294 where the retrieved UCS data is parsed. A step 296 will then load the data in device memory and then a step 298 will test to see if the parsing of the remote or local UCS data is complete. If the step 298 is not complete for local data (NO) then the step 294 will be invoked again until the step 298 is true (YES) for local UCS files. If the step 298 for remote UCS parsing is not complete (NO) then a step 300 will create a remote link list for any UCS data described to still reside on the server 10 for any future transcripts to the client. Then a step 302 updates the UCS memory with the remote links and continues with the step 294 until the remote parsing step 298 is complete (YES).

After the UCS data has been parsed and is loaded into memory, then a step 304 determines the view type or combination of view types for the UCS data. Depending on the view type either Image View 254, Document View 258, or Sheet View mode 256 is invoked and then the UCS data is displayed or rendered in a step 306. After displaying the UCS data in the step 306 the client data processing application waits for user input in a step 308. If the user navigates within the loaded document using menu options, or track/scroll wheel, stylus or keypad then the step 308 will be repeatedly invoked until the user terminates the reader 252 by choosing the exit option and a step 310 will exit the mobile reader and return to the invoking application prior to the step 282. If the user selects or invokes a more request in the step 308 for additional UCS data, then the step 290 will be invoked again with the same following process flow as previously described until the user chooses to terminate the application in the step 308 and then the step 310 will exit the mobile reader and return to the invoking application prior to the step.

FIG. 13 is a, diagram 320 representing the document engine structure with a hypothetical document loaded for the document-processing module 50. The composition of the document engine is a collection of individual components that are categorized as the following modules, an Engine Module 322, a set of Distiller Modules 324 and a loaded document 326 and Decorator Modules (not illustrated). The distiller module 324 functionality is mainly to handle different document types. This set of modules is responsible in particular for parsing a known document format, constructing the document structure and, if desired, persisting the document structure back to a known document format. The set of distiller modules 324 is open in the sense that new distiller modules can be added or removed at runtime to accommodate the need for a flexible environment. So the set of supported document types can be expanded or reduced as required. The engine module 322 functionality is mainly to host the running distiller modules 324 and, if desired, the loaded documents 326, offering a uniform environment for these. It is also used to provide common behavior for clients (e.g. loading a document). A plurality of the document structure modules are the building pieces of a loaded document. They include: a document node 328 (representing the loaded document and containing all other nodes), contents nodes 330 (representing the contents with a certain detail degree of a document), a pair of container nodes 332, 334 (representing containers for other nodes), a text component 336 (representing textual content), an image component 338 (representing image content), a vector component 340 (representing vector content), and a table component 342 (representing table data such as spreadsheets). The document structure 326 is a tree-like structure (with the possibility of sharing of nodes, so the more appropriate description would be graph-like). This fact allows the user to practically construct documents in any fashion desired without being constrained by a rigid document structure.

This is achieved by the fact that each node implements collection like methods (for children and/or parents). Behavior like rendering can be attached to the node itself or be offered as an external component. This is facilitated by the existence of a set of standard iterators of the document structure. The choice between internal and external behavior can be taken by taking into consideration and the requirements of the intended operation (speed, size, deployment etc.) The decorator modules functionality (not shown in FIG. 13) is mainly to perform customized selected operations on the document structure. Examples include the extraction of the table of contents, list of bookmarks or hyperlinks, find operations etc. It is here where the transcerption technology is employed. They are separate modules, with their own framework, that operate completely independent of the other engine components. In fact the engine can operate without the decorator modules being installed. They just add more functionality. The decorator modules framework is composed of a decorator manager (which is by itself a component) and a set of installed modules that perform certain operations. The individual modules have to register in a predefined way in order to integrate into the framework and be recognized by the decorator manager. A decorator is a software component as commonly referred to by those skilled in the art of software development designed for the sole purpose of navigating the Document Object Model (DOM) to retrieve specific content and/or navigational information. In other words it can be stated that a decorator component constitutes a command. There are no limitations on how many decorators can be used to navigate the DOM. Typical decorators (commands) are: retrieve bookmarks in a document, retrieve hyperlinks in a document, retrieve a Table of Content for a document, construct a summary for a document if no TOC is available, retrieve a specific page, find textual content within a document, retrieve specific font styles or information, retrieve an image or illustration within a document, etc.

FIG. 14 illustrates the relationship 350 of a parent 352 and a child node 354 within the document engine 320. The actual link between the parent 352 and the child 354 is a little more complex than a pointer between the two. Between them there is a so-called specifier 356 object whose role is to hold attributes of the link. By attributes of the link typically is meant information on the parent or children object IDS that are associated since this is a graph like structure and a single parent can have multiple children and a child can also have multiple parent objects.

The operation of the invention is to take provided input in the form of an electronic document structured or unstructured or data streams which embodies textual and non textual content typically represented by graphical imagery such as pictures or illustrations and drawing data represented in the form of vectors or commonly known as descriptions on how to draw a line from position A to B. Electronic documents are best described but not limited to business or personal correspondence letters, product information and representation thereof, parts manuals, corporate or personal financial information and such like. FIGS. 15 and 16 represent respectively a unstructured document and a structured document.

FIG. 15 illustrates how a typical unstructured document 360 might look like. By unstructured is meant that the document has minimal navigation information and structured elements such as headers, footers, tables, and font style use upon which the invention can directly extract such format and navigational information for the purpose of delivering and reconstructing partial document content back to the invention's client side data processing system 250. The server side 10 data processing capabilities then have to be employed to construct such navigational and reconstructing information by analyzing the unstructured document data.

The analyzation is done by detecting changes in font size, font type, font style and font positioning. By analyzing this all textual content elements 362 will be marked as headers by the following criteria's: largest used font size=14, font style=Bold, font type=Arial. This is reinforced by a text paragraph definition 364, which all have font size=10, no font style and font type=Times. By identifying the headers 362 based on this information the invention can construct a navigational aid in the form of a Table of Contents where none exists for the unstructured document. An embedded image 366 will have the image insertion point coordinates x, y as well as a width and height information all in pixels. The system 10 of the invention can then provide a link to the image 366 when rendering this on the client side application processing system 12 and element 368 which is marked out because of a font style change within a text paragraph 364 will also be marked as a header, but ranked with a lower importance then the other headers 362 as it is positioned within the text paragraph 364. The element 368 will then be used by the server side 10 application processing when creating a navigational aide in form of a Table of Contents as the element 368 is deemed to have navigational significance. Likewise elements of a type 370 and 372 will be detected by the invention's server side processing capabilities as the fonts positioning of these elements are in close proximity in addition to the usage of the font styles Bold and Italic and finally usage of a Tabulator (TAB) character for spacing. These all indicate that this section has significance to the document 360 and can be marked as a navigational aide point when construction a Table of Contents. Finally a page element 374 defines a page number description that is associated as a known navigational index reference for all the unstructured content residing on the documents page 1.

FIG. 16 illustrates a structured document 380 that can be processed by the server side data processing system 10 with the purpose of identifying a document navigational structure in the form of a Table of Contents and defining content excerpts with the intent to reconstruct it on the client side processing application 12. A Table of Contents (TOC) 382 is defined as an existing element in the structured document. Content elements 384 and 386 referenced as Heading 1 and Heading 2 are defined as paragraph headers 388 and are used as navigational elements in the construction of the TOC entity 382 by the document itself. The server side data processing application 10 can therefore directly extract these elements without the processing required for an unstructured document. Further the System 10 will be parsing the structured document to identify a hyperlink 390 to a bookmark 1. A hyperlink is a navigational link between to objects or entities within a structured document indicating that they are connected and related and that by interacting with the hyperlink the user can navigate to a different part of the document. The system 10 will make a record of the hyperlink entity 390 and use it for navigational purposes. A bookmark entity 392 is another element defined within the structured document 380 itself that provides a navigational anchor point that the system 10 will make a record of for the purpose of allowing the execution of the navigational hyperlink entity 390. Hyperlink entities 392, 394, 396 are different from the hyperlink entity 390 by being external hyperlinks. External hyperlinks are defined as link objects pointing to other content or external applications or processes defined within the structured document 380 itself.

One hyperlink 392 will launch an Internet Browser with the address pointing to a website address www.arizan.com, or second hyperlink 394 to www.air2web.com, while the link 396 will launch an email application program with the "To" address set to sales@arizan.com. The server side data processing system 10 will, while processing the structured document, record these elements in the constructed Document Object Model for navigational or possible application launch purposes for software applications employing the invention. An Image element 398 in the structured document 380 provides information on an image/picture and position x, y and width, height information that the System 10 invention will record in the DOM thus giving the client component 12 the ability to reconstruct this element on a wireless device 12 in the right visual and content context. A table element 400 as defined by the structured document 380 contains content displayed and organized in a table like fashion. The invention's server side data processing functionality will read this information and map it when constructing the DOM utilizing the Document Engines table component to allow the invention's client side processing system to reconstruct this in a table like structure on a wireless device/pda 12.

A graph element 402 in the structured document contains information in a graph type format such as bar chart and links to the data provided in the table element 400 used when drawing the chart by the application reading the structured document such as a word processor like MS Word by Microsoft Corporation. The server side data processing capabilities will retrieve and record the graphs link and rendering information when processing the structured document for the intent of having the client side data processing system reconstruct the graph on a wireless device/pda 12. A header element 404 defines page header information for each individual page in the structured document, while a footer element 406 defines page footer information that will be reused for each single page in the structured document 380. The server side data processing capabilities will record the elements 404 and 406 and construct the appropriate entries in the DOM. A page entity 408 also provides a navigational index while navigating the structured document 380 as each page entity is a sequential entry that allows the user to look up an individual page within the page range starting with start page and ending with last page. The structured document as represented by FIG. 16 also embeds non-visual descriptive information about the document referred to as metadata 410. The invention's server side data processing capabilities are able to extract this information and store it in the DOM where it can later be used by the system 10 to provide document information such as document name, author, date, time created etc. as defined by the metadata stored in the structured document.

FIG. 17 illustrates the Document Object Model 420 as constructed by the invention's server side data processing system 10. The illustration 420 represents the load document's general structure 422. The DOM's entry point is a content node 424. Each of a plurality of containers 426 can have multiple components of different types. The invention server side data processing application has four component types defined: a table component 430, a text component 431, an image component 432 and a vector component (not illustrated). Each component can also be referenced by other components under the same container 426 or different containers in the form of a reference command FIG. 18 illustrates the text component 430 as employed by the server side data processing system 10 after constructing the Document Object Model (DOM) 420 and after loading the structured document 380 illustrated by FIG. 16. Each text component 430 can have more than one section command 440, and as typically found for any standard structured or unstructured document, multiple paragraphs 442 can be included in one single section 440. The paragraph object 442 has one attribute 444 defined, which is a reference to a Table Of Content hyperlink. A hyperlink start object 446 itself is defined by its attribute object 448, which describes the hyperlink ID and the destination of the link. Then a text segment object 450 has a describing attribute 452 that holds the textual content itself for the text object 450. At the end of the paragraph object 442 a Hyperlink End object 454 is constructed with an attribute object 456 containing the Hyperlink pair ID.

FIG. 19A illustrates a Document Object Model 460 of a loaded structured document 380 and the DOM composition for a paragraph as employed by the server side data processing system. A paragraph object 462 has an attribute object 464 that describes the associated style and the textual content of the paragraph 462. A Font object 466 contains a font command and an associated attribute object 468 contains the font description and the font style information. The next command object linked to the paragraph object 462 is a Bookmark object 470 and it's descriptive attribute object 472, which contains the Bookmark ID. Next the paragraph object 462 is linked to a text object 474 and it's associated attribute object 476 with the value of the textual content itself. FIG. 19B then continues the DOM paragraph composition 460 started by FIG. 19A. The next command object linked to the paragraph object 462 is a text command object 478 and an associated attribute object 480 containing the text value. Next is a new font command object 482 and an associated attribute object 484 containing the font type and style definition. Then the following objects linked to the paragraph object 462 are respectively text command and font command objects and related attributes 486-496 until the paragraph composition ends with a reference command object 498 and an associated attribute object 500 containing the reference value.

FIG. 20 illustrates the table component 428 as employed by the server side data processing system 10 after constructing the Document Object Model (DOM) and after loading the structured document 380 illustrated by FIG. 16. Each table component 428 can have multiple row objects 510, 512, in which there might be one or more cells contained. FIG. 20 illustrates the first row of the sample table in the sample structured document 380. The table row command object 510 links to a cell command object 514, which has an associated attribute object 516 containing the textual content value of the cell. Additional cell command objects 518, 520, 522 and 524 will then be linked to the table row command object 510 until no more data is available for that row.

FIGS. 21A-21F illustrate the server side data processing systems 10 description of content output in the form of a Universal Content Stream (UCS) as employed by the invention to transport data in a effective and optimized way for wireless delivery of the data over the Internet 16 to be processed by the client side data processing system 12. FIGS. 21A-21F has two tables each representing the server side processing capabilities in outputting a UCS data file representing commands to reproduce a structured document 380 and a unstructured document 360 as represented respectively in FIGS. 16 and 15.

Referring to FIG. 22, a layout of one UCS format 530 is illustrated. The UCS (Universal Content Stream) format 530 provides the mechanism and data transport layer between the server 10 and the client technology or device 12. The format primary purpose is to enable only the required visual image being sent in an optimal fashion over the available bandwidth. The format 530 supports the transfer of graphical images/pictures, 2D/3D drawings and various textual data such as word processor, and spreadsheet content.

The UCS can include several different standard formats for information transport in addition to the transcept command and data transfers to utilize the transcept technology and any available bandwidth. Embedding optional standard formats within UCS opens up for easy integration with client technology that do not require transcerption support. And for formats such as image/raster data the existing/coming standards such as JPEG 2000 will offer adequate support for compression without data loss from the server 10 to client 12.

Examples of the industry standard formats that can be accessed by both the server 10 and other clients directly are the following four types:
XML for textual, metadata and content information
SVG for vector information
JPEG 2000 for images
OpenGL 3D representation
Other standard formats or proprietary formats can be easily added or removed through the plugable and scalable architecture of the component based server 10.

The UCS format 530 includes three different data layers that together with optional industry standard formats make up the UCS format 530. The three proprietary layers are: a TCL layer, a UCS textual content layer 534, and a UCS image or vector data layer 536.

The TCL (Transcept Command Language) layer 532 provides a data channel for two-way communication between the server 10 and the client 12. The client 12 sends requests to the Client handler on the server side and receives a response with an transcept data stream in return. The TCL handles the following types of commands: Transcept requests for visual images, VQ (View and Query) commands, directory information, published document search/retrieve, and any required third party synchronization information. The TCL language itself is also constructed using XML for easy adaptation and future expansion.

The UCS vector stream 536 is a highly optimized vector format to provide vector-drawing capabilities on the thin client software. This enables the thin client software to offer vector representation for higher quality and accuracy on even small PDA's or handheld devices. The vector stream transfer and rendering is controlled through the TCL layer 532 which ensures that the Transcerpt handler will only generate a vector representation for the clipped viewable area requested by the client 12 and also to render it in an optimal fashion for the limited client display area that generated the request. The UCS format 530 is designed in such a fashion that new proprietary layers or formats can easily be added. Any of the formats used for transportation of images, vector and text can also be replaced or added depending on integration requirements by third parties.

The Universal Content Stream (UCS) 530 is a binary file format specification, which enables delivery of original document content including, but not limited to textual content, image data, vector data and navigational information for the processed document. The UCS format is very efficient in overcoming the current limitation of the wireless devices 12 in respect to available bandwidth, which today in general is in the range of 9.6 to typically 48 although higher speeds are theoretically possible. The UCS addresses the limited bandwidth problem in a number of ways.

The UCS format 530 allows original document file sizes to be reduced by up to ninety percent (90%) while retaining all essential content and necessary format information for reconstructing the document on wireless devices using the client side processing capabilities. This reduction in size is achieved by stripping out non-essential formatting information that is used by the original document application, e.g. MS Word for rich presentation on desktop computer. Non-essential formatting information might be use of different font styles, font colors, and revision information, etc. which typically have no value on the wireless device 12 as the device screen might be monochrome or grayscale and the device typically has only one font type. The UCS file format also allows server side compression of the UCS file and client side decompression for further reduction in size. For compression common available technology in the form of compression algorithms such as LZW can be utilized. In addition the server side processing capabilities in producing transcerpts (excerpt of content for transmission) allows the generation of multiple UCS files for individual transmission from the server to the client in an iterative process where the resulting UCS file sent to the wireless device is a result for a specific content query from the user. The iterative query process from the user on a wireless device requesting content from the server might typically result in the delivery of for example ten individual UCS files delivered to the device. The UCS file format includes information on how these individual UCS files link together so that the original document can then be reconstituted by the individual files in memory for a coherent viewing or reading experience. The UCS format also contains the Document Object Model (DOM) ID to ensure that the server 10 processing capabilities can delivery the correct DOM information to the requesting device 12. In addition the UCS file format also contains Internet hyperlinks allowing the client to request more content from within the document. Command codes can also be embedded in the UCS format to facilitate the execution of specific processes by the server side data processing capabilities. This is typically a request for specific content, lookup in the navigation information stored within the DOM, etc.

DEFINITION OF TERMS

1. Anatomization—A specific technology process for parsing and analyzing a structured or unstructured document or data source with the purpose of establishing a uniform Document Object Model containing all content and a navigation document hierarchy.

2. Bookmarks—A navigational link associating a navigational reference from position X to position & within a document.

3. DOM—Document Object Model (DOM), a programming interface specification being developed by the World Wide Web Consortium, defines how to create and structure XML based documents as objects.

4. External File—reference to an associated external data or document file outside the original document.

5. External Object—reference to an associated external data object outside the original document.

6. Font Color—The color of the font.

7. Font position—The rendering x, y pixel or character positioning information.

8. Font Size—Font size in points indicating the size of a font character.

9. Font Style—The style of the font as in normal, italics, bold, underline, etc.

10. Font Type—Name of font type used in document e.g., Times Roman.

11. Footer—Footnote at the bottom of an individual or all pages in a document containing content.

12. Header—Header at the top of an individual or all pages in a document containing content.

13. Hyperlinks—A navigational link external or internal to the document content referencing a bookmark or external data or content source.

14. Page—Defines an individual age in a document containing content information typically separated by a page break character of a fixed page or printer page size definition.

15. Paragraph—Collection of textual characters or lines of text grouped together in a cohesive body separated by line breaks.

16. Predictive Caching—A specific technology process designed to cache relevant or associated content on the server prior to required delivery/transmittal to a wireless/wired device to minimize bandwidth and network latency.

17. Table of Content (TOC)—Presents a hierarchical navigational structure to the document content for informing and assisting in navigation of the document content.

18. Title Styles—Predefined styles in a document centric creation application to allow for the construction of a Table of Content such as Heading 1, Heading 2, Heading 3, etc.

19. Transcerption—A specific technology process for delivering only the requested content excerpt and transmitting this to the client.

20. USC—The Universal Content Stream is a content data format optimized for minimized data size while preserving content context, navigational and presentation information for delivery to wireless/wired devices.

21. XML—eXtensible Markup Language is a flexible way to create common information formats and share both the format and the data on the World Wide Web, intranets, and elsewhere.

What is claimed is:

1. A method for providing content at a portable computing device, comprising:
   transmitting a request to a server for content associated with a document remote to the portable computing device;
   receiving reconstructed identified portion or portions of the document associated with the requested content; and
   displaying the reconstructed identified portion or portions of the document using a document reader software application, the document reader software application generating a graphical user interface having a plurality of view modes, wherein the software application determines which of the plurality of view modes is optimal for different types of data, and renders the data in the optimal view mode or a combination of view modes.

2. The method of claim 1, wherein the reconstructed identified portion or portions are in a predetermined format compatible with the portable computing device.

3. The method of claim 1, wherein the document includes visual document representation and document content.

4. The method of claim 3, wherein the reconstructed identified portion or portions are indexed according to elements in the document content.

5. The method of claim 1, wherein the reconstructed identified portion or portions comprises navigational links mapped to a navigational tree.

6. The method of claim 3, wherein the document content has been processed to improve quality.

7. The method of claim 1, wherein the reconstructed identified portion or portions comprises a metadata header for the document.

8. The method of claim 1, wherein the reconstructed identified portion or portions comprises a table of contents such that said portable computing device can utilize said table of contents to request said content.

9. The method of claim 7, wherein the reconstructed identified portion or portions comprises a universal content stream.

10. The method of claim 1, wherein the view modes include an image view that displays image or picture based data, a document view that displays textual content in a rich and intuitive way, and a file view that displays a user interface for loading and saving one or more files on the device.

11. The method of claim 1, wherein the software application automatically renders the data in the optimal view mode or a combination of view modes.

12. A method for delivering content to a portable computing device from a server, the method implementable at said server, the method comprising:
   receiving a request from the portable computing device for content associated with a document remote to the portable computing device;
   identifying one or more portions of the document associated with the requested content;
   reconstructing the identified portion or portions of the document from elements of the document stored in a Document Object Model (DOM) Storage;
   analyzing the portions of the document associated with the requested content to identify document type;
   processing said portions in accordance with the identified document type in order to improve the document quality;
   indexing the portions of the document according to elements of the document content stored in the DOM storage; and
   transmitting the reconstructed identified portion or portions to the portable computing device for display thereon as a universal content stream (UCS) comprising a transcerpt command language (TCL) layer, a textual content layer and at least one of an image layer and a vector data layer.

13. The method of claim 12, wherein said TCL layer comprises a data channel for two-way communications between said server and said portable electronic device.

14. The method of claim 13, wherein said TCL comprises at least one of transcerpt requests for visual images, VQ (View and Query) commands, directory information requests, published document search requests, published document retrieve requests, and third party synchronization information requests.

15. The method of claim 12, wherein said vector data layer comprises an optimized vector format to provide vector-drawing capabilities on said portable electronic device.

16. The method of claim 15, wherein transfer and rendering of said vector data layer is controlled through said TCL layer.

17. The method of claim 12, wherein said UCS comprises a binary file format specification.

18. The method of claim 12, wherein said UCS comprises content and format information for reconstructing the document at said portable electronic device using the client side processing capabilities.

19. The method of claim 18, wherein said UCS is stripped of different font styles information, font color information, and revision information.

20. The method of claim 12, wherein said UCS comprises multiple UCS files for individual transmission from said server to said portable electronic device in an iterative process where a resulting UCS file sent to said portable electronic device device is a result for a specific content query.

21. The method of claim 20, wherein a UCS file format includes information on how individual UCS files link together so that said document can be reconstituted by the individual UCS files in memory at said portable electronic device.

22. The method of claim 12, wherein a UCS file format further comprises a DOM ID.

23. The method of claim 12, wherein a UCS file format further comprises Internet hyperlinks allowing said portable electronic device to request more content from within said document.

24. The method of claim 12, wherein a UCS file format further comprises embedded command codes to facilitate execution of specific processes by said server.

* * * * *